March 18, 1969  E. P. BUCKLIN, JR., ET AL  3,434,110
OPTICAL CHARACTER READING SYSTEM
Filed July 6, 1965

INVENTORS
EDWARD P. BUCKLIN JR.
WERNER POLLACK
CARL O. CARLSON

BY Louis A. Kline
John J. Maclago
Dominick Nardelli
THEIR ATTORNEYS

March 18, 1969  E. P. BUCKLIN, JR., ET AL  3,434,110
OPTICAL CHARACTER READING SYSTEM Filed July 6, 1965  Sheet 2 of 10

INVENTORS
EDWARD P. BUCKLIN JR.
WERNER POLLACK
CARL O. CARLSON

BY Louis A. Kline
John T. Matlago
Dominick Nardelli
THEIR ATTORNEYS

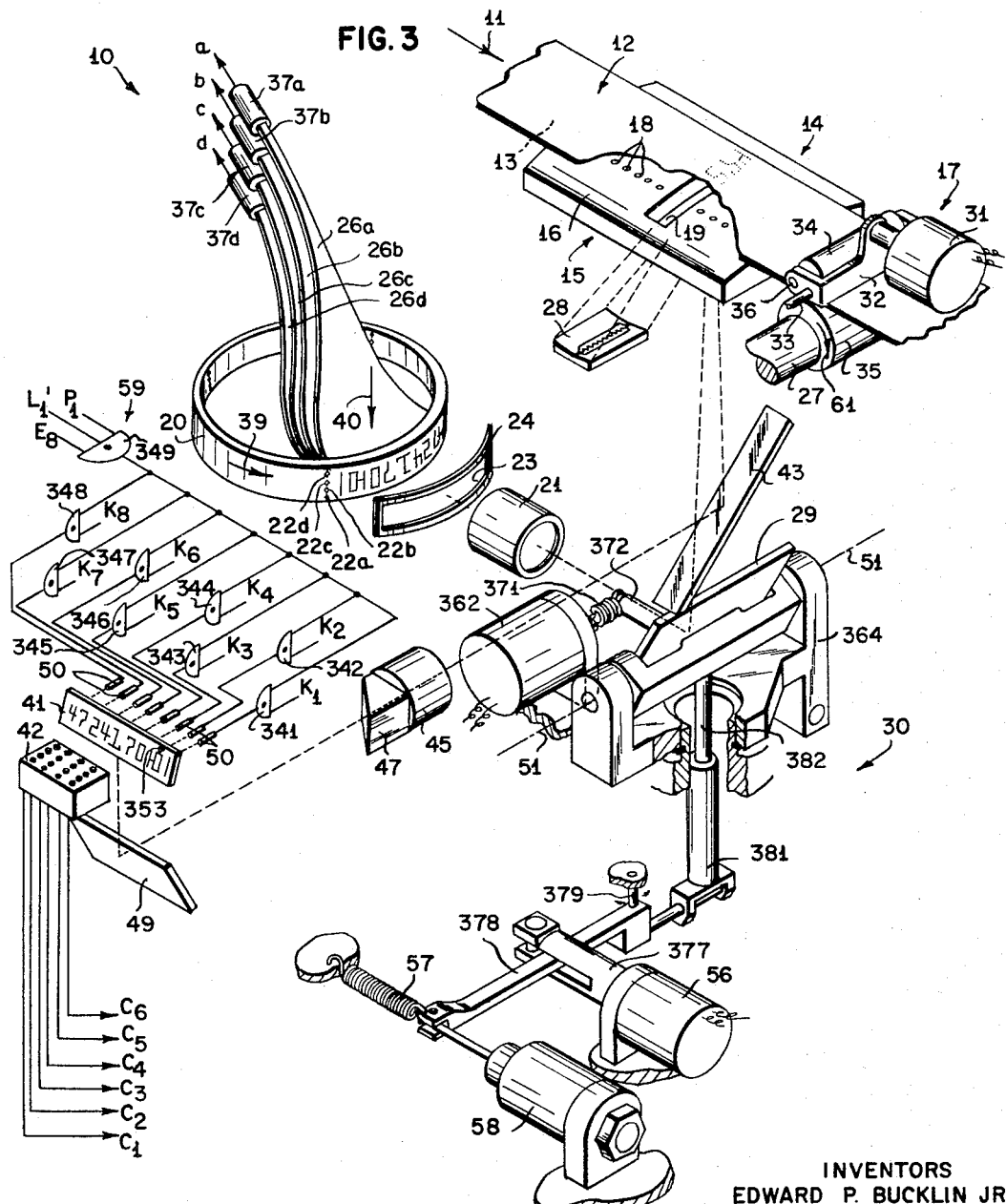

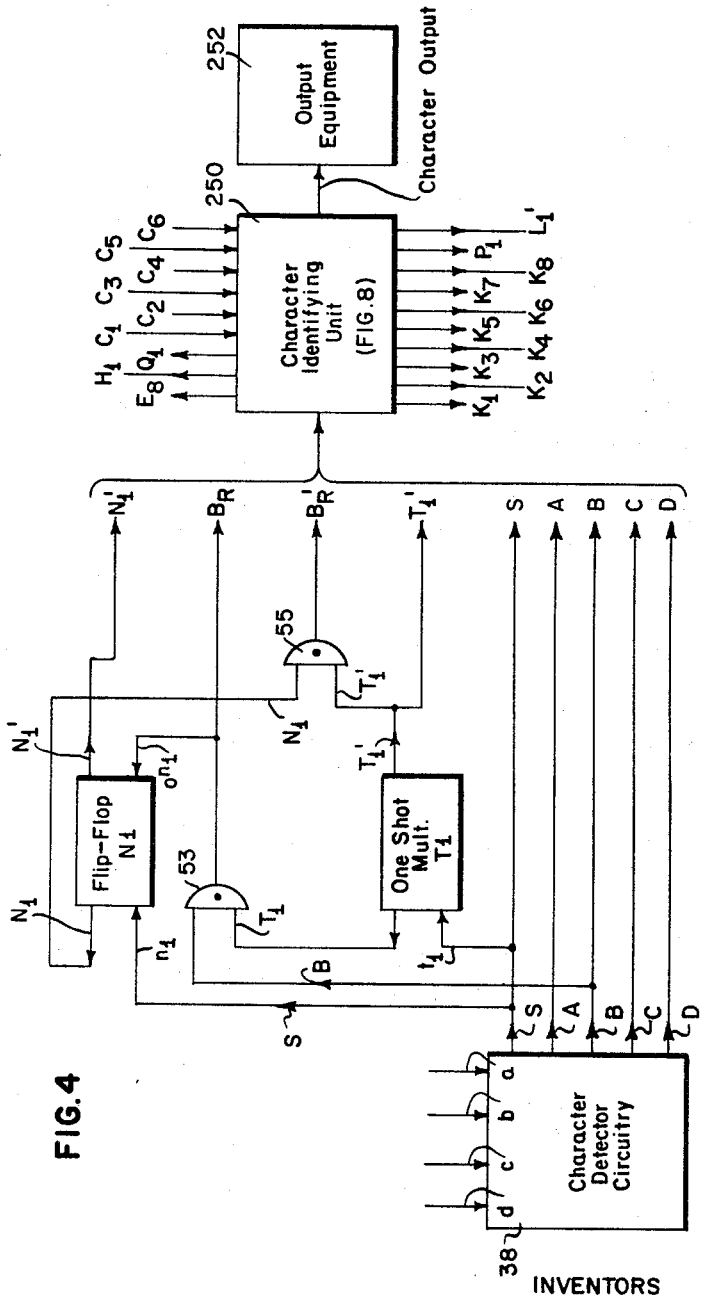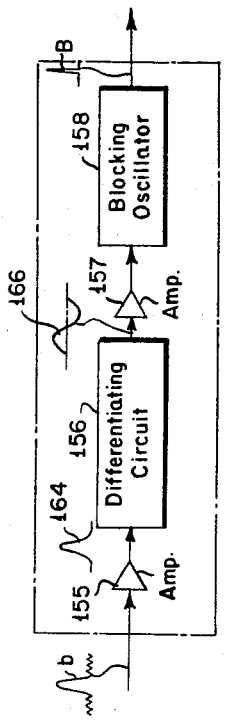
FIG.5
FIG.4

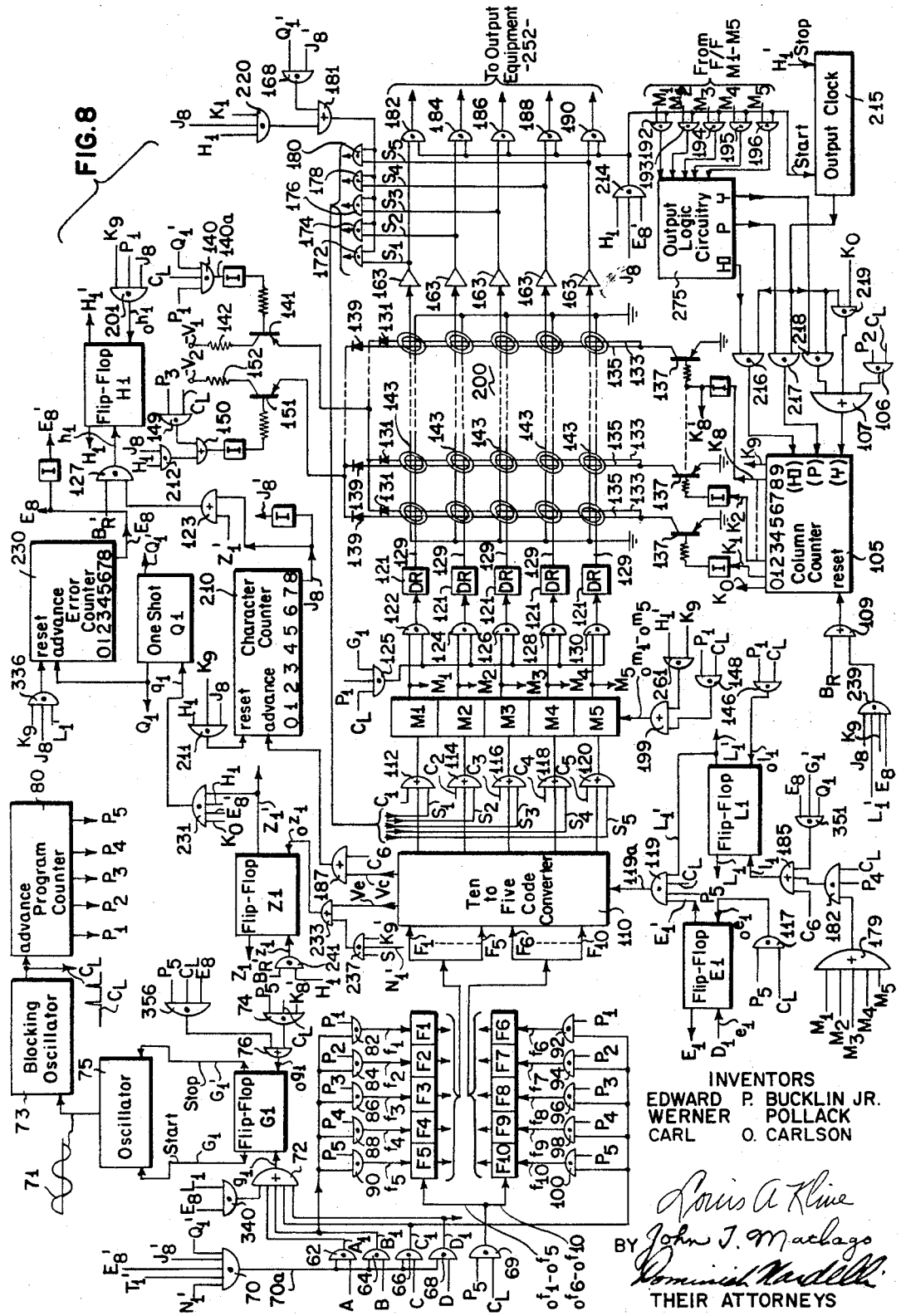

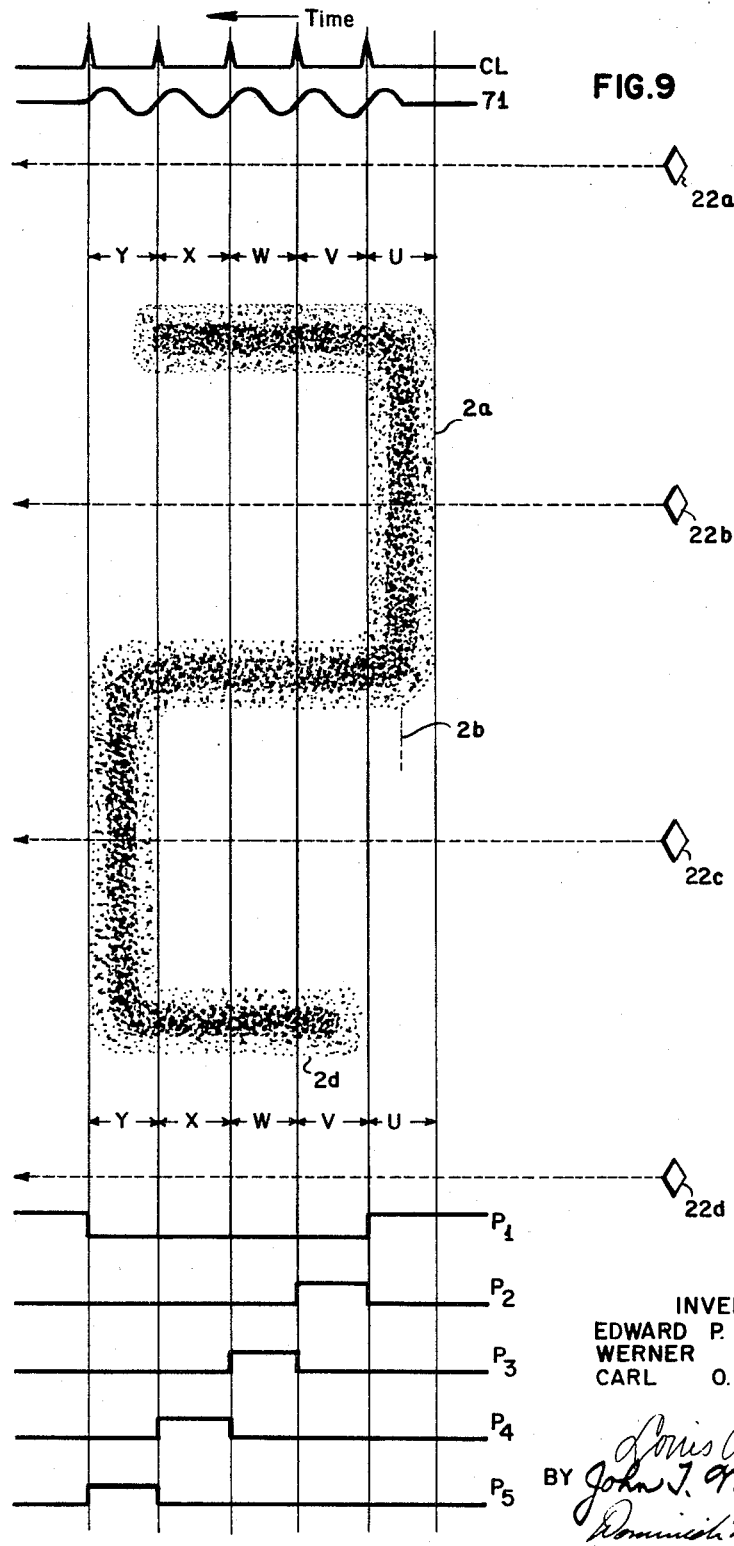

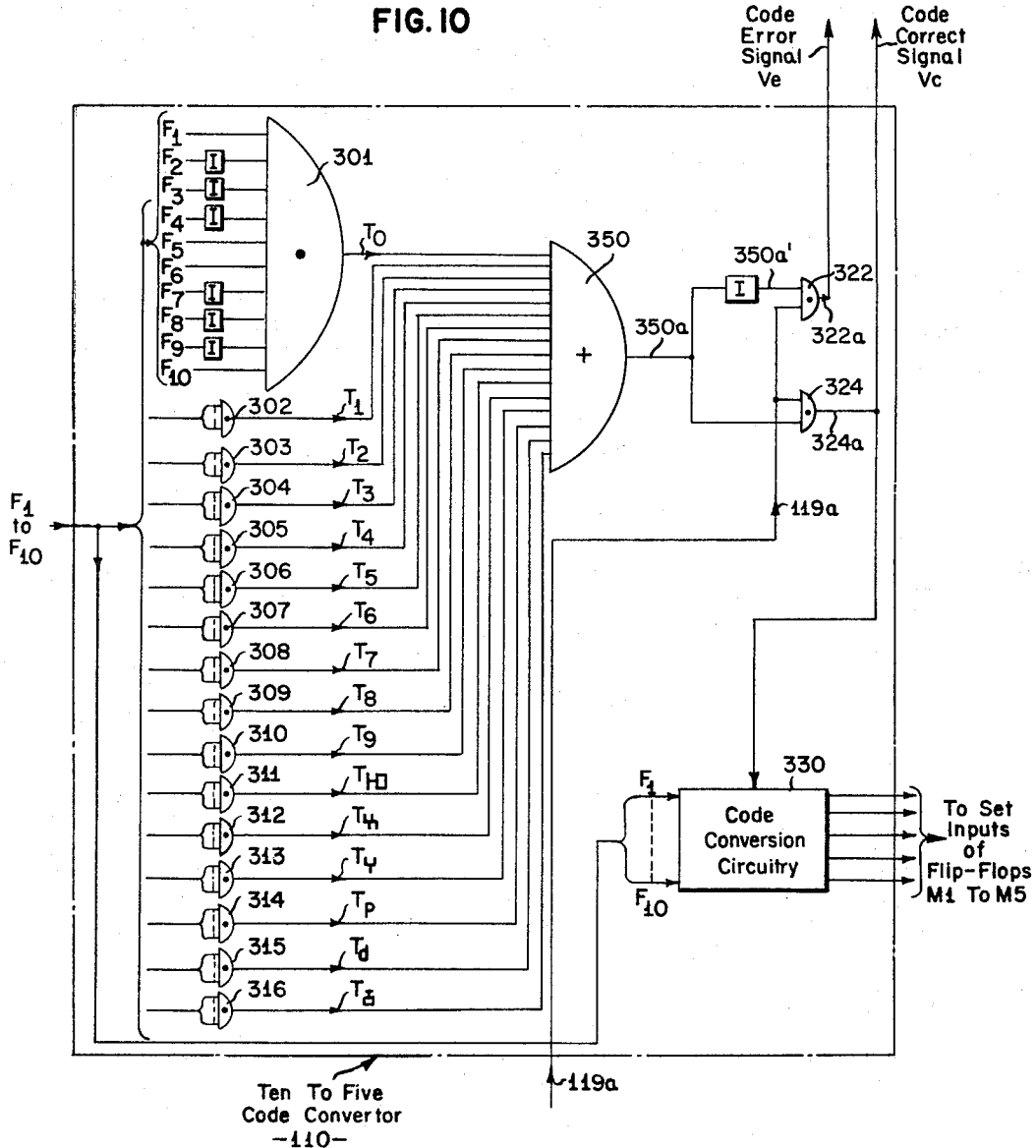

INVENTORS
EDWARD P. BUCKLIN JR.
WERNER POLLACK
CARL O. CARLSON

THEIR ATTORNEYS

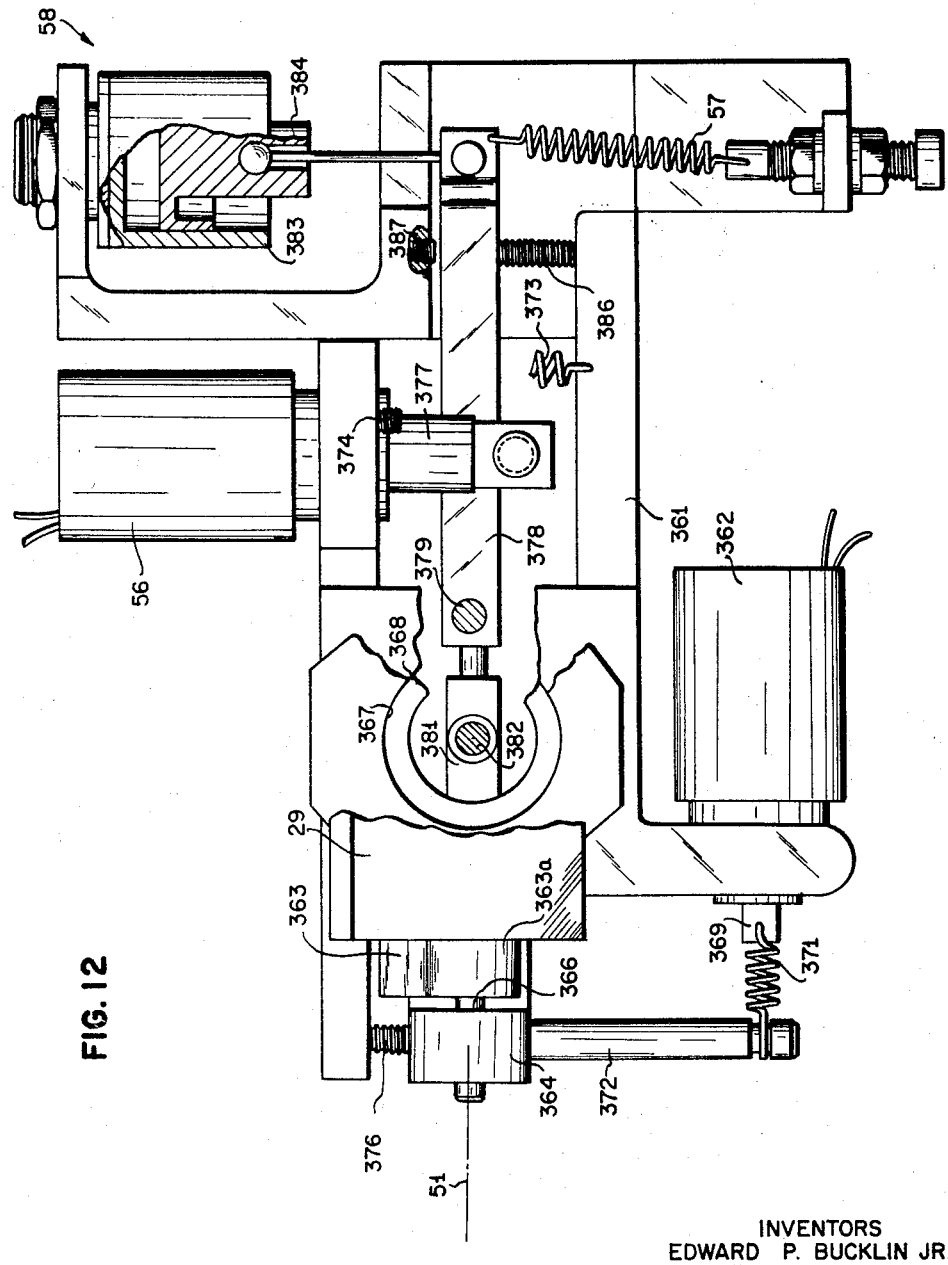

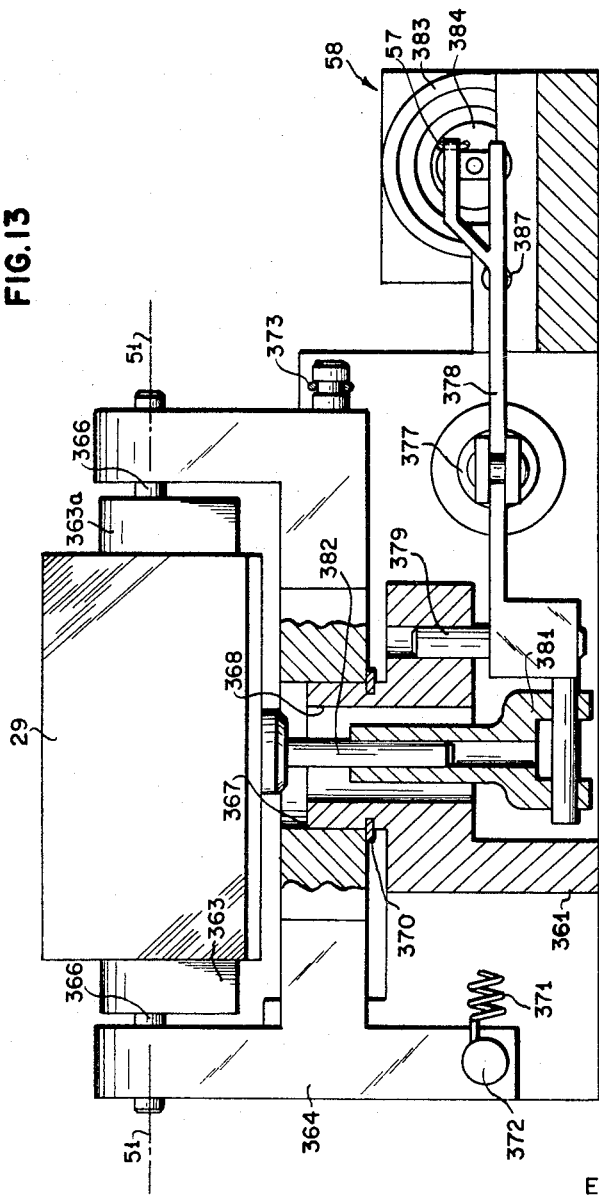

3,434,110
OPTICAL CHARACTER READING SYSTEM
Edward P. Bucklin, Jr., Hawthorne, Werner Pollack, Santa Monica, and Carl O. Carlson, Los Angeles, Calif., assignors to The National Cash Register Company, Dayton, Ohio, a corporation of Maryland
Filed July 6, 1965, Ser. No. 469,692
U.S. Cl. 340—146.3          14 Claims
Int. Cl. G06k 9/00

ABSTRACT OF THE DISCLOSURE

A system arrangement is disclosed for optically scanning documents to provide translation of printed characters into signals for use directly in data processing, and wherein concurrent scanning, error checking and storage of characters is provided for high speed reading. Rescanning of characters misread is provided by altering optical projection of character images by movement of a mirror simulating the required movement of the document for scanning. Each character not recognizable by the system is displayed on a screen along with other characters in a row, and a light spot is automatically projected by the system on the characters not recognized by the system whereby an operator can manually enter the character on a keyboard to provide continuing and complete translation of characters from the document.

---

This invention relates generally to an optical character reading system and, more particularly, to systems having improved means for rereading and transferring incorrectly read characters.

Rapid development of character reading systems, that are capable of reading conventionally printed information, has been due to the need for direct use of printed documents by computers without manual conversion of the information into computer language on punched paper tape or other record medium. It is of obvious benefit to be able to read records of business transactions, which are printed on ordinary paper stock, and transfer these records directly into the computers without the need of manually converting the printed information into computer language.

Character reading systems have been developed which have two sensing or reading apertures on a scanning means which scan across a row of stylized characters. The systems are capable of reading or recognizing relatively poor quality printed characters and serve as suitable inputs for computers. Systems of this type have been disclosed in U.S. Patent No. 3,102,995 and in the commonly assigned copending patent application of Frank R. Schmid Ser. No. 238,371, filed Nov. 19, 1962, now U.S. Patent No. 3,270,319 and of Richard K. Gerlach Ser. No. 122,126, filed July 6, 1961, now U.S. Patent No. 3,217,294. In these systems, it was recognized that it is considerably less expensive to develop optical character reading systems which are capable of reading stylized characters, than to read non-stylized characters, printed by the printing mechanisms that are provided on present business machines, e.g. adding machines, cash registers, etc. Also, it was found that the printing mechanisms that are provided on present business machines produce printed characters having wide tolerances. For example, the weight and uniformity of the print varies, the spatial relationship of the characters is not uniform and the characters may be skewed. In addition, the printed paper tape produced by these business machines may contain marks due to ink splatters or foreign particles in the paper stock which could be interpreted as a portion of a character, or there may be gaps in the character segments or such variation in shading which appear as gaps in the segments of a character. Any of these faults in a printed character makes recognition of the character by any reading system difficult. In the systems of the prior art, the paper tape, on which the stylized characters are printed, is moving slowly relative to the scanning means in a direction normal to the scanning direction, to allow each row of characters to move, in turn, within the reading range of the scanning means. When the two scanning apertures scan across a character within predetermined upper and lower scan paths, electrical signals are produced which represent the character. However, due to the fact that the wide tolerance printing is present, the electrical signals may not represent the character, i.e., the character may be misread. When this happens, in systems of the prior art, the paper tape which is moving relative to the scanning means, is stopped, backed-up, and again moved in the forward direction, so that the system is able to rescan the row. Because of the tolerances in the system, the back-up operation of the tape produces a variation in the path of the rescan so that there is a very good possibility that the two sensing apertures, will cross the unread character during the rescan over slightly different sections of the predetermined upper and lower scan paths of the character. During the rescan, the electrical signals produced may or may not represent a character depending on the nature of the print. If the character is again misread, another rescan is performed. If, after a predetermined number of rescans and reading attempts by the system, the character still remains unread, the system stops reading to allow the operator to manually transcribe all the characters in the row containing the unreadable character into the memory of the system.

While the systems of the prior art are successful in reading relatively poor quality printing, improved operation of the overall system is required to meet the demands of modern business, since the mechanism which physically reverses the motion of the paper tape is complicated and requires considerable maintenance. This is especially a problem since the reverse movement of the tape is only on the order of ¼″, and occurs quite frequently during operation of the equipment, thus causing wear on the tape. Thus, in accordance with the character reading system of the present invention, improved operation is obtained by not reversing the motion of the tape with respect to the scanning means, in order to perform a rescan of a misread character in a given row. Instead, the tape is stopped and a mirror is provided in the optical system which mirror when pivoted slightly causes the area immediately ahead of the row of characters, to be again projected onto the scanning means. Then, the rate at which the mirror pivots back to its original position is controlled by suitable means so that the forward motion of the paper tape is simulated. Since only the mirror needs to be pivoted on an axis, it has also been found that the rescan operation is faster than before and the mechanism for pivoting the mirror requires practically no maintenance. Still faster operation of the system is obtained by providing means in the system which requires the operator to manually transcribe into the memory of the system only the unread characters in the row instead of all the characters in the row.

Accordingly, an object of this invention is to provide in a character reading system a means which allows for rescanning a row of characters without the need of reversing the motion of the tape relative to the scanning means.

Another object of the present invention is to provide in a character reading system an optical means which projects onto the scanning means of the system the area immediately ahead of the row to be scanned and then moves the image of the row in the direction to simulate the advance motion of the tape with respect to the scanning means so that the system may rescan the row.

Another object of the present invention is to provide a display means which, whenever one or more characters in a row is unreadable to the system, points out the unreadable characters to the operator of the system so that the operator is required to transcribe only the unreadable characters in the row into the memory of the system while the system retains in memory the properly read characters in the row.

The above objects are accomplished in the typical embodiment of the present invention by combining novel means in a system, that is in general similar to the character reading system disclosed in the aforementioned copending patent application Ser. No. 238,371. However, in the present embodiment, the tape is read at a faster rate by having some of the operations performed in parallel. Thus, error checking and storage of a character which has just been read are performed while the next character is being read. After the system has scanned a row, a decision is made as to whether to output the information or to perform a rescan. If a rescan is required, a pivotable mirror is used to resweep the image of the row of characters past the sensing means, e.g., the two read apertures on a rotating drum. After a predetermined number of rescans, some characters are still unread, and they are deemed unreadable by the system. Whenever a row of characters contains one or more unreadable characters, the tape stops and the system displays an imge of the row of characters with the unreadable characters on a screen, and logical circuitry means are provided to project light spots on the screen to point out the unreadable characters. The first unreadable character as pointed out by the light spot is manually transcribed into the memory of the system by punching a key on a keyboard. Then, the logical circuitry means searches out the next unreadable character in the row (if there is one) and projects the light spot at that character so that this character may be manually transcribed. When all the characters in the row are stored within the memory of the system, a signal is produced to cause the contents of the memory to be outputted to the computer, and the system proceeds to read the next row.

The specific nature of the present invention as well as other advantages, objects, and uses thereof, will become apparent to those skilled in the art as disclosure is made in the following detailed description of a typical embodiment of the present invention illustrated in the accompanying drawings in which:

FIG. 3 is a pictorial schematic of the optical reading or scanning system in accordance with this invention;

FIG. 4 is a block diagram of the circuitry for the character reading system;

FIG. 5 is a block diagram of a typical portion of the detector circuitry shown in FIG. 4;

FIG. 8 is a more detailed block and schematic diagram of a detailed embodiment of the character identifying unit shown in block form in FIG. 4;

FIG. 9 shows the relationship of a typical stylized character with respect to the program counts provided by the program counter of FIG. 8, and with respect to the scanning apertures during a "read" scan;

FIG. 10 is a block diagram illustrating in detail the ten to five code converter of FIG. 8, showing in particular, the logical circuitry for producing the correct code signal $V_c$ and the error code signal $V_e$;

FIG. 12 is a plan view and partial section of the optical back-up means shown in FIG. 11;

FIG. 13 is a front elevation and partial section of the optical back-up means;

FIG. 15 illustrates the image of a row of characters projected on the drum periphery when the drum is rotating in the direction as shown in FIG. 3; and FIG. 16 illustrates the image of a row of characters projected on the drum periphery when the drum is rotating in a direction opposite to that shown in FIG. 3.

Referring now to the drawings, wherein like reference numerals designate like or corresponding parts throughout the several views, a set of sixteen stylized characters are illustrated in FIG. 1 which are recognizable by the typical character recognition system in accordance with the invention.

Figure 1:
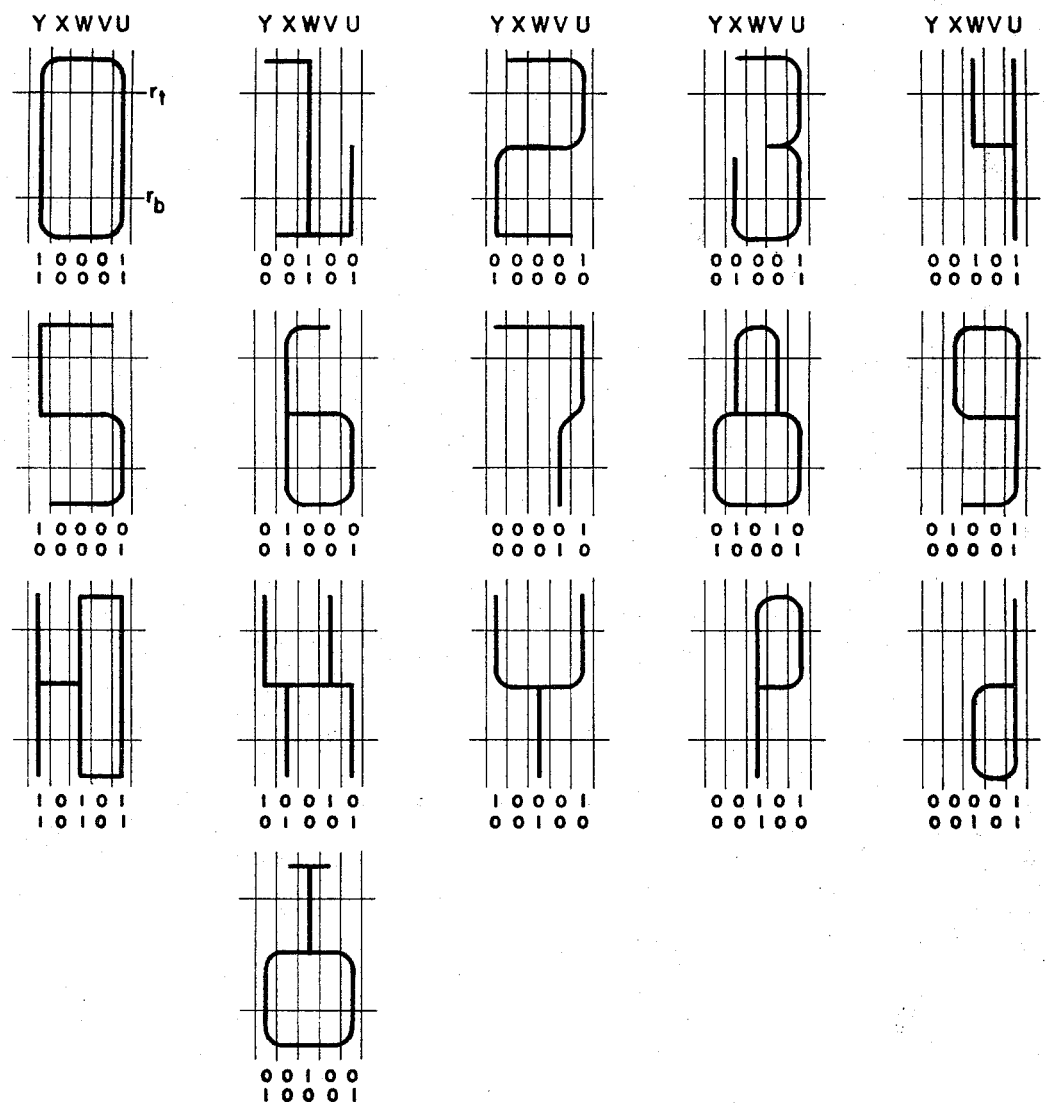
FIG. 1 shows a plurality of typical stylized characters for use in the typical embodiment of a character reading system in accordance with the invention described herein.

As shown in FIG. 1, the sixteen characters comprise decimal digits "0" through "9" and six additional characters or symbols. Each character is divided into five vertical zones, U, V, W, X, and Y, one or more of which zones contain character information in the form of vertical segments or lines used in forming the character. It will be understood that the lines in FIG. 1 designating the zones, U, V, W, X, and Y, are provided merely for illustrative purposes and would not appear on actual printed characters.

The horizontal paths in FIG. 1 designated $r_t$ and $r_b$ passing through the top and bottom halves of each character, such as the character "0," indicate the two properly located scanning paths across zones U, V, W, X, and Y for which the presence or absence of a vertical segment in each zone is detected in order to obtain character information from which the character can be identified. If the presence of a vertical character segment in a zone is designated as a binary "1," and the absence of a character segment in a zone is designated as a binary "0" then, if a character is scanned along the top and bottom paths $r_t$ and $r_b$ as indicated, a five-digit binary number will be obtained for each path as shown below each character in FIG. 1. The two five-digit binary numbers thus obtained may be considered as a ten-digit binary number, the stylizing of the characters in the system being such that a different ten-digit binary number is obtained for each character.

The stylizing of the characters in the system is chosen to be such that two reading errors are required in order to mis-identify a character, i.e., substitution of one character for another. For example, in scanning the letter "O" in FIG. 1, if the vertical segment in zone U of the scan along the path $r_t$ were absent because of improper printing, the five-digit binary number obtained for the top scan along path $r_t$ would be 10000 instead of 10001. An examination of the other characters in the system will reveal that there is no other character in the system having the five-digit binary number 10000 for the top scan along path $r_t$ which also has the five-digit binary number 10001 for the bottom scan along path $r_b$. Thus, an error of this type can be recognized and would not cause the character to be mistaken for any other character in the system. It will also be noted in FIG. 1, that each character is stylized so that a vertical segment is provided in zone U in either or both of the paths $r_t$ or $r_b$. This is done to permit accurate control of horizontal registration, as will hereinafter become evident.

Figure 2:
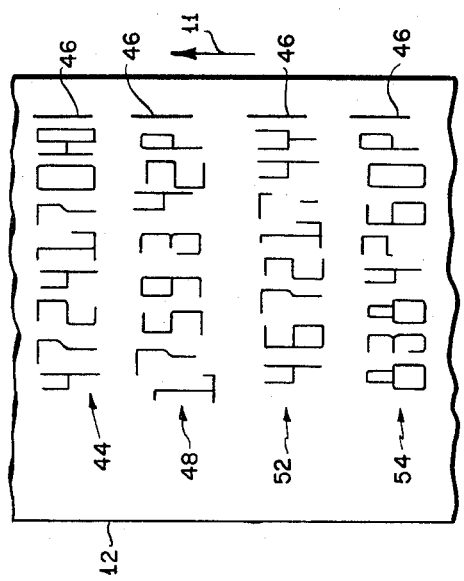
FIG. 2 illustrates a business document in the form of a short section of a paper tape having rows of stylized characters printed thereon.
Figure 11:
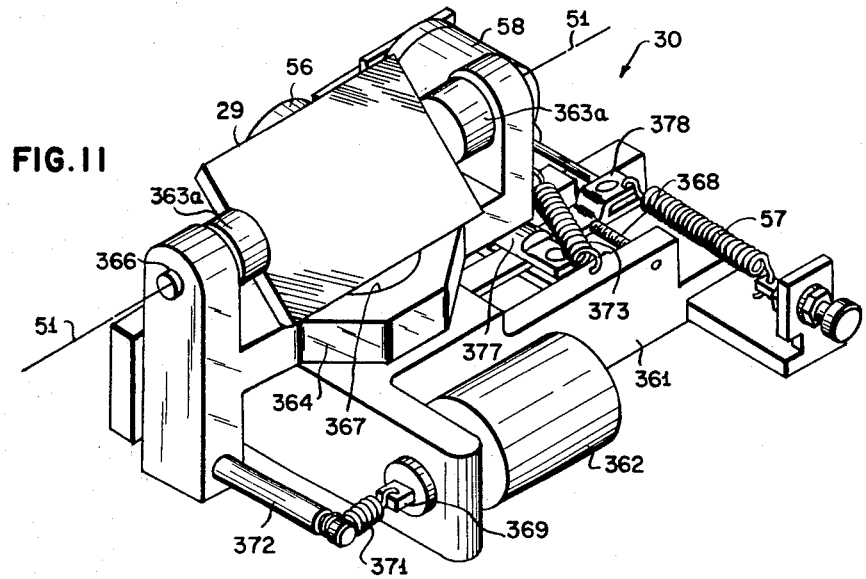
FIG. 11 is a perspective view of the optical back-up means schematically shown in FIG. 3.
Figure 14:
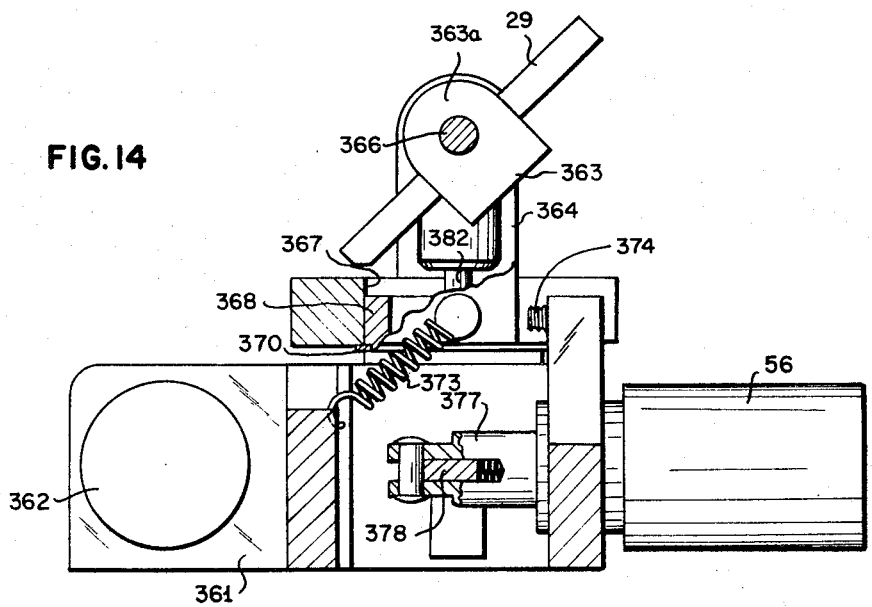
FIG. 14 is an end elevation and partial section of the optical back-up means.

Referring now to FIG. 2 a typical section of paper tape 12 from a cash register, adding machine or other business machine is shown having rows of stylized characters printed thereon, the stylizing being in accordance with FIG. 1. It will be noted that a vertical line or reference mark 46 is located to the right of each row of characters and extends vertically above portions of the characters in each row. While the provision of such a reference mark 46 is not essential, it does offer certain advantages which make its use desirable as will hereinafter become evident. The first row of characters 44 shown on the tape 12 in FIG. 2 is typical of a complete row of characters in which no misregistration or printing errors in the characters is visibly noticeable. The second row 48 on the tape 12 in FIG. 2 illustrates a group of characters having both vertical and horizontal misregistration, the characters "4," "7," and "1" being misaligned vertically, the characters "3" and "9" having excessive spacing therebetween, and the characters "4" and "2" being closer together than normal. The last two rows of characters on the tape 12, rows 52 and 54, each illustrate a situation where a portion of one of the characters on the row is absent because of improper printing. In row 52, a portion of the character "7" is missing while, in row 54, the entire lower portion of the character "2" is missing. The manner in which these typical rows of characters in FIG. 2 are read in the system of the present invention will become evident from the typical embodiment of the invention to be described herein.

Initially, it will be helpful to briefly summarize the overall operation of the typical embodiment to be described herein, as a result of which, rows of characters such as illustrated in FIG. 2 are read. First, each row of characters is progressively scanned by successive sweeps across the row as the tape 12 is moved past a reading station in the direction indicated by the arrow 11 in FIG. 2; e.g., the top portion of the characters of the first row are scanned first and in subsequent sweeps the remainder of the characters in the row are scanned. A "read" scan is then performed on each character in the row, independently of the other characters in the row, when each character has moved to a position so that scanning is approximately along the proper paths $r_t$ and $r_b$ shown in FIG. 1, and a record is made of each character read. After all eight characters on a row have been read and recorded, scanning is temporarily halted while the characters in the row are read-out into the suitable output equipment, the manner of character read-out being determined in accordance with a particular one of the characters in each row, specifically, the character nearest the reference mark 46. Employing such a procedure for read-out, the characters in row 44 in FIG. 2 would then be outputed in accordance with the character

HJ in the row, the characters in rows 48 and 54 would be outputed in accordance with the character "P," and the characters in row 52 would be outputed in accordance with the character

Y

Another operating feature of the typical embodiment of the invention to be described herein is that, if an error is detected in a particular row, the paper tape 12 is stopped and an optical back-up means 30 (FIG. 3) is provided so that the system rapidly rescans the row in an attempt to obtain a proper reading. If after seven possible rescans a correct reading of all the characters in a row still cannot be obtained, an error signal is outputted; the row containing the error is displayed on a screen 41; and the image of each unread character is marked in turn on the screen so that the operator by use of a keyboard can manually enter one at a time the unread characters into the system. Scanning then proceeds to the next row.

Referring now to FIG. 3, a schematic representation is illustrated of an embodiment of an optical detector 10 for the optical character reading system in accordance with the invention. The paper tape 12, containing rows of printed characters on the under side 13 thereof, is advanced by paper drive means 17 in the direction of the arrow 11, so as to traverse a reading station generally indicated by the numeral 14 at which each row of characters is optically scanned. The reading station 14 includes a rectangular support 15 having a convex surface 16 on which the side 13 of the tape 12 slides. The tape 12 is held against the surface 16 of support 15 by a vacuum drawn through small holes 18 formed in the support 15. Since a portion of the tape 12 is shown broken away, only some of the holes 18 are illustrated; however, the holes 18 are also provided under the tape 12 and on both sides of a rectangular slot 19. A row of characters is visible through the slot 19 when the row is aligned therewith.

The drive means 17 causes the paper tape 12 to slide over the support 15 in the direction of arrow 11 whenever a solenoid 31 (suitably supported) is de-energized. When solenoid 31 is de-energized, a release spring (not shown) within the solenoid urges an L-shaped lever 32 counter-clockwise (as viewed in FIG. 3) about a fixed shaft 33, so that an idler roller 34 pinches the tape 12 between it and a continuously rotating roller 35 and the tape is moved in the direction of the arrow 11. The idler roller 34 is disposed to rotate about an axle 36 fixed between opposite arms of lever 32, and the rotating roller 35 is being rotated clockwise in the direction of arrow 61 by suitable means (not shown) on a fixed axle 27. A row of characters on tape 12 when aligned with the rectangular slot 19 in the support 15 is illuminated by a suitable light source and reflector 28.

Optical scanning of the row of characters exposed within slot 19 of support 15 is accomplished as follows. An image of the row of characters in slot 19 is projected by way of a mirror 29 (on the optical back-up means 30 to be described hereinafter) and lens 21 onto the periphery of a rotating drum 20. The drum 20 is rotated at a constant speed by suitable means (not shown) in the direction of the arrow 39, and the drum serves as the scanning means of the optical detector 10. Since the tape 12 is moving in the direction of the arrow 11, the image of a typical row of characters focused on the drum 20 moves in the direction of arrow 40 as a result of the image being inverted upon passing through lens 21. In order that the image formed on the rotating drum 20 may be in focus for the entire length of the row of characters extending across the width of the tape 12, the convex surface 16 of the support 15 is made to conform to the curvature of the drum periphery, and the vacuum drawn through the small holes 18 causes the section of the tape 12 at the reading station 14 to assume the same curvature as the surface 16.

Also, an image of the row of characters is projected on a frosted glass screen 41 by way of a fixed mirror 43, lens 45, an image rotating prism 47, and another fixed mirror 49. The screen 41 is conveniently placed to be visible to the operator of the equipment. There are also located behind the screen, eight grain-size lights 50, each disposed to shine a light spot 353 over a respective character of the row of characters imaged on the screen. Each light is turned on by suitable logic circuitry means 59 in a manner to be hereinafter described to indicate any character that is unreadable to the system.

The rotating drum 20 is provided with a plurality of identical groups of apertures equally spaced around the drum periphery, each group comprising four diamond-shaped apertures, such as illustrated by numerals 22a, 22b, 22c, and 22d in FIG. 3 for one such group. Interposed between the drum 20 and the lens 21 there is shown a stationary shroud 24 surrounding a portion of the drum periphery and having a viewing slot or window 23 therein of sufficient size to permit a row of characters to be imaged on the drum periphery. The resulting image is simultaneously scanned along four parallel paths by each group of four apertures as the group traverses the window. The number of groups of apertures, the rotational speed of the drum 20 and the speed of the tape 12 moving in the direction of arrow 11 are such that a row moves, for example, one eighth of a character height between scans.

Four light beam guides 26a, 26b, 26c, and 26d, made, for example, of Lucite, are positioned adjacent the inner peripheral surface of the drum 20 opposite the window 23 in the shroud 24 so as to correspond to apertures 22a, 22b, 22c, and 22d, respectively. Changes in light level produced as each group of apertures 22a, 22b, 22c, and 22d scans the image on the rotating drum 20 are then transmitted through the respective beam guides 26a, 26b, 25c, and 26d to photosensitive elements 37a, 37b, 37c, and 37d, respectively. These photosensitive elements 37a, 37b, 37c, and 37d are responsive to light variations appearing in their respective beam guides 26a, 26b, 26c, and 26d to produce respective electrical signal outputs a, b, c, and d which are fed to character detector circuitry 38, as shown in FIG. 4.

Referring to FIG. 4, the detector circuitry 38 is constructed and arranged to provide five output signals A, B, C, D, and S in response to the four input signals a, b, c, and d applied thereto. The signals A, B, C, and D consist of spike-shaped pulses of predetermined magnitude derived from input signals a, b, c, and d, respectively. Each of the pulses of the signals A, B, C, and D, thus represents the detection of a vertical character segment by its respective aperture 22a, 22b, 22c, or 22d. Since only the presence or absence of a character segment in each zone need be detected because of the stylizing employed, the apertures 22a, 22b, 22c, and 22d may be made sufficiently large so that the detector circuitry 38 can more easily distinguish character segments from minor imperfections in the paper, or from other minor extraneous marks. Preferably, the apertures 22a, 22b, 22c, and 22d are of diamond-shape, as shown in FIG. 9, with a transverse dimension approximately equal to the average width of a vertical character segment. In such case, the signals resulting from a great majority of foreign matter or spurious marks on the paper will represent only a relatively small percentage of the total area viewed by an aperture while, on the other hand, the signal resulting from a vertical character segment will represent the greater percentage of the total area viewed, thereby facilitating the distinguishing of character segments from the great majority of the other extraneous marks.

Before continuing with the description of the embodiment of FIG. 4, reference will be made to FIG. 5 to illustrate how the detector circuitry 38 is capable of producing output signals A, B, C, and D whose shaped pulses accurately represent the detection of vertical character segments by their respective apertures 22a, 22b, 22c, and 22d.

Referring to FIG. 5, it will be seen that a typical portion of the detector circuitry 38 includes an amplifier 155 which amplifies an input waveform, such as the waveform b obtained in response to the detection of a vertical character segment, and adjusts its clipping level to eliminate noise, thereby producing the resultant signal waveform 164. The signal waveform 164 is next differentiated in differentiating circuit 156 to provide the signal waveform 166. The signal waveform 166 is then amplified in amplifier 157 and coupled to the input of a blocking oscillator 158, which circuits are so constructed and arranged to cause the shaped output pulse B to appear at the output of the blocking oscillator 158 in response to the negative-going zero crossing of the differentiated waveform 166.

It should be noted that, by deriving each output pulse (e.g., pulse B) in response to the negative-going zero crossing of its differentiated detected waveform, each output pulse will occur substantially at the center line of its corresponding vertical segment regardless of its width. This most advantageous result is of great value in obtaining accurate horizontal registration, as will hereinafter become evident, and is achieved because the print of a vertical segment inherently grows lighter by equal amounts on each side of its center line; consequently, the negative-going zero of the differentiated waveform, in response to which the output pulse representing the segment is produced, necessarily occurs substantially at the center line of the vertical segment.

Figure 6:
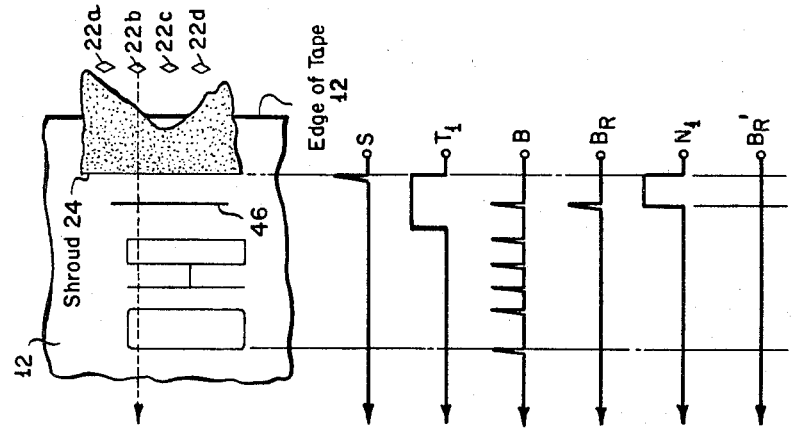

Having described the derivation of a typical pulse which is typical also of signals A, C and D, the description of the FIG. 4 embodiment of the invention will now be continued. It will be noted in FIG. 4 that, in addition to the signals A, B, C, and D, detector circuitry 38 provides a fifth output signal S. This output signal S is produced by the detector circuitry 38 in response to the abrupt change in the intensity of light seen by all four of the apertures 22a, 22b, 22c, and 22d as each group of apertures leaves the darkness of the shroud 24 and moves into the light of the window 23. At such a time, a large amplitude signal is produced by each of the respective photosensitive elements 37a, 37b, 37c, and 37d, in response to which, a unique pulse S can be produced by the detector circuitry 38, which preferably is chosen to have the same magnitude and shape as the pulses of signals A, B, C, and D (such as illustrated in FIG. 6). Each pulse S, therefore, may then be conveniently used to indicate the beginning of each scan of a row of characters.

Besides the signals A, B, C, D, and S obtained at the output of the detector circuitry 38, additional signals $N_1'$, $B_R$, $B_R'$, and $T_1'$ are also required in the typical embodiment of FIG. 4. These additional signals provide information relating to the detection of the reference mark 46 (FIG. 2) at the right end of each row, and may conveniently be derived from the signal S (which is a pulse appearing at the start of each scan) and the signal B (which produces a discrete pulse each time a vertical character segment, or reference mark, is detected by the aperture 22b). The derivation of these additional signals $N_1'$, $B_R$, $B_R'$, and $T_1'$ as well as their significance will be better understood by reference to FIGS. 6 and 7 along with FIG. 4.

Figure 7:
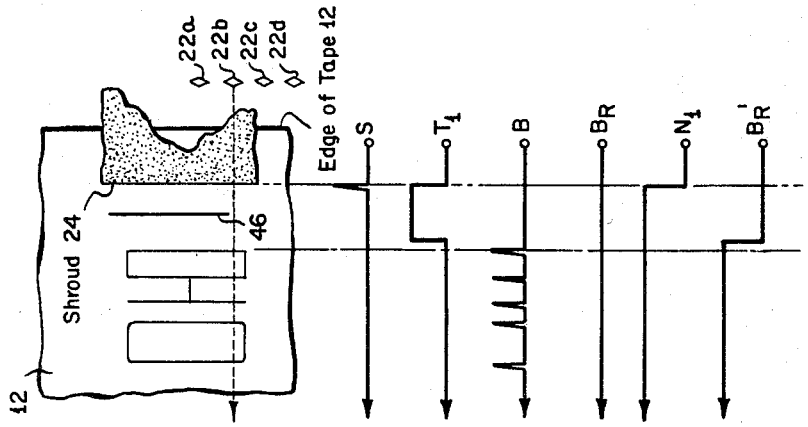
FIGS. 6 and 7 show the right end portion of a row of stylized characters on a typical paper tape and the various waveforms derived by the circuitry of FIG. 4 in response to the initiation of a scan and the intersection of a reference mark provided at the right end of each row.

In FIGS. 6 and 7, a portion of a row of characters on the tape 12 is shown, the shroud 24 being cut away to better illustrate the apertures 22a, 22b, 22c, and 22d, which are shown in a position such that they will shortly leave the shroud 24 and enter the area of the window 23 to begin another scan of a row of characters. Also shown in FIGS. 6 and 7, below the tape 12 are waveforms which illustrate the derivation of the signals $N_1'$, $B_R$, $B_R'$, and $T_1'$, the waveforms in FIG. 6 representing the situation where the aperture 22b intersects the reference mark 46, and the waveforms in FIG. 7 representing the situation where the aperture 22b fails to intersect the reference mark 46.

Referring now to FIG. 4 along with FIGS. 6 and 7, it will be seen that the signal S is fed to the set input $t_1$ of a normally false one-shot T1 and to the set input $n_1$ of a flip-flop N1. Thus, as shown in the corresponding waveforms S, $T_1$ and $N_1$ in FIGS. 6 and 7, at the appearance of the pulse S (when apertures 22a, 22b, 22c, and 22d leave the shroud 24), both the one-shot T1 and the flip-flop N1 are switched to their true state, as indicated in FIGS. 6 and 7 by their respective true outputs $T_1$ and $N_1$ becoming more positive (positive representing true and zero representing false). While only the waveforms for the true outputs $T_1$ and $N_1$ of flip-flops T1 and N1 are shown in FIGS. 6 and 7, it will be understood that the false outputs $T_1'$ and $N_1'$ will always be in a state opposite to the state of their respective true outputs $T_1$ and $N_1$. The time for which the one-shot T1 remains true before returning to its false state is chosen in accordance with the maximum time allowed for the reference mark 46 to be intercepted if it is in the path of aperture 22b.

The signal B from the detector circuitry 38 is fed to an AND gate 53 along with the true output $T_1$ of the one-shot T1. Thus, as will be understood from the corresponding waveforms $T_1$, B, and $B_R$ in FIGS. 6 and 7, an output pulse $B_R$ is obtained from AND gate 53 only if a pulse is produced by signal B while $T_1$ is true; that it, if aperture 22b intercepts the reference mark 46 before one-shot T1 returns to its false state. In FIG. 6, aperture 22b intercepts the reference mark 46 so that a pulse $B_R$ is produced at the output of AND gate 53. However, in FIG. 7, no signal $B_R$ is produced, since aperture 22b does not intercept the reference mark 46. Thus, a pulse $B_R$ is produced during a scan of a row of characters only if the reference mark 46 is intercepted by aperture 22b. It will be noted that because the one-shot T1 remains true only for a predetermined time during which the reference mark is expected, other pulses produced by the signal B at other times will not be confused as the reference mark 46.

Having explained how the pulse $B_R$ is derived, which represents the situation where aperture 22b intercepts the reference mark 46 during a scan, it will now be explained how the signal $B_R'$ is derived, which represents the situation where aperture 22b fails to intercept the reference mark 46. Referring again to FIG. 4, it will be seen that the derived signal $B_R$ is fed to the false input $_0 n_1$ of flip-flop N1, which is switched to the true state at the start of each scan by the pulse S. Thus, as shown in waveform $B_R$ and $N_1$ of FIGS. 6 and 7, if the reference mark is intercepted by aperture 22b (FIG. 6 situation), the pulse $B_R$ is produced and flip-flop N1 is switched back to its false state. The signal $B_R'$ is now derived by feeding the true output $N_1$ to an AND gate 55 along with the false output $T_1'$ of the one-shot T1. Then, as shown in the waveforms of FIG. 6, if the pulse $B_R$ appears, $N_1$ will be switched false before $T_1'$ becomes true and the signal $B_R'$, which is the output of AND gate 55, will thus remain false during the scan. However, as shown by the waveforms in FIG. 7, if the pulse $B_R$ does not appear because the aperture 22b does not intercept the reference mark 46, flip-flop N1 will not be switched false and will thereby be true when the one-shot T1 returns to its false state, causing $T_1'$ to become true. When this occurs, the output signal $B_R'$ of AND gate 55 will also become true (since both $N_1$ and $T_1'$ will be true) and, as shown by waveform $B_R'$ in FIG. 7, will remain true until $T_1'$ again becomes false when the pulse S produced at the start of the next scan switches one-shot T1 to the true state.

The signals $B_R$ and $B_R'$ derived as just described are fed, along with the false outputs $N_1'$ and $T_1'$ of flip-flop N1 and one-shot T1, respectively, and the signals A, B, C, D, and S obtained from detector circuitry 38, to a character identifying unit 250 (FIG. 4) which contains the identifying, recording and outputting means for the character reading system. The character identifying unit 250 is constructed and arranged for operation in response to those signals applied thereto to identify each character in the row being scanned, to provide for error detection and for rescanning of a row in response to a detected error, to store the character identifying information for each character until all the characters in the row have been read, and then to output each row of characters to suitable output equipment 252 in a manner determined by the character in the row adjacent the reference mark 46.

Besides providing for character read-out, the character identifying unit 250 also provides an output signal $E_8$ whenever a row has been scanned eight times, in response to a detected error in the row, without being able to properly read the row. Also signals $K_1$, $K_2$, $K_3$, $K_4$, $K_5$, $K_6$, $K_7$, $K_8$, $L_1'$, and $P_1$ are outputted. These signals are used to control in a manner to be hereinafter described, which one of the lights 50 (FIG. 3) needs to be lighted to show the unreadable character on the screen 41.

The character identifying unit 250 additionally provides signals $H_1$ and $Q_1$ from flip-flop H1 and one-shot Q1 in the unit 250 to control the movement of the tape 12 and the mirror 29, respectively, in a manner to be described hereinafter. At this time, it will be sufficient to note that flip-flop H1 becomes true during character outputting to energize the solenoid 31 (FIG. 3) and halt the movement of the tape 12. Also flip-flop H1 becomes true when an error is detected. One-shot Q1 becomes true when an error has been detected in a row to energize another solenoid 56 (FIG. 3) causing the mirror 29 to rotate slightly (less than one degree in a clockwise direction about an axis 51) so that the row containing the error may be rescanned. Since the drum 20 is constantly rotating, there is a high degree of probability that the re-scanning operation would be randomly different from the preceding scanning operation. Therefore, a correct reading may be obtained during the re-scan.

Referring now to FIG. 8, a detailed block and circuit diagram is illustrated of the character identifying unit 250 shown in FIG. 4. Before considering the circuitry of FIG. 8, however, it will be helpful to first provide a functional description of the operations which the character identifying unit 250 is to perform in accordance with the invention. These are listed below as follows:

(1) Operation of the identifying circuitry of unit 250 is initiated when the aperture 22b first intercepts the reference mark 46 which, as described in connection with FIGS. 4, 6, and 7, may be determined by the appearance of the pulse $B_R$.

(2) Each character in the row has a "read" scan performed thereon when the fourth aperture 22d first fails to intercept any portion of the character, thereby insuring correct vertical registration.

(3) After aperture 22b intercepts the reference mark of a row of characters, horizontal registration and column identification are achieved by cycling a program counter 80 through a predetermined number of counts (for example, five except that when the last or eighth character in the row is being read, the program counter 80 is cycled twice for a total number of ten counts) each time any one of the four apertures 22a, 22b, 22c, or 22d intercepts the vertical segment provided in zone U for each character. The position of each character in the row is then located by a column counter 105 which counts the number of times the program counter 80 is cycled. The use of four apertures instead of only the two required for scanning the paths $r_t$ and $r_b$ (FIG. 1) assures that there would be no error in the column count since at least one aperture will always intercept the vertical segment provided in zone U of each character for a wide range of vertical misregistration.

(4) After the aperture 22b first intercepts the reference mark adjacent a row of characters, character information is detected for every scan as the row is progressively scanned. However, the character information detected is not used for recognition; that is, no "read" scan is performed on a character until the aperture 22d first fails to intercept any portion of the character.

(5) After all eight characters in the row have been read and recorded for outputting which condition is indicated by signal $J_8$ becoming true, there is no further detecting of character information, and scanning continues until the aperture 22b first misses the reference mark, indicating that the row has been scanned. This indication is conveniently provided by the signal $B_R'$ becoming true, as described in connection with FIG. 4. At such a time, the flip-flop H1 is switched to the "true" state energizing the solenoid 31 (FIG. 3) to stop the tape 12, and all eight characters of the row which have been recorded are now outputted in a manner determined by the character adjacent the reference mark. After all eight characters have been outputted, flip-flop H1 is switched back to the false state and scanning proceeds to the next row. It should be apparent that the stopping of the tape 12 would be unnecessary when the outputting does not require more time than required to begin the scanning operations of the next row of characters.

(6) In the event that in performing a "read" scan on one of the characters in the row, the character information detected is recognized as an error, or that eight columns are not counted in the row, an error signal is generated to switch flip-flop H1 to the true state. The result is that the solenoid 31 is energized to halt the tape 12 when the row of characters is aligned with slot 19 as indicated by signal $B_R'$ being true. Next, one-shot Q1 is switched true to energize solenoid 56 rotating the mirror 29 slightly about axis 51 (in a manner to be hereinafter described) until the mirror 29 causes the area, immediately in front of the row of characters, to be projected on the rotating drum. When one-shot Q1 switches false, the solenoid 56 is de-energized and the reverse rotation of mirror 29 is controlled by dashpot 58 to simulate the movement of the tape in the direction of arrow 11. A re-scan is thereby performed on the row containing the error. The re-scanning is permitted to occur seven times and, if an error is again detected during the seventh re-scan, the signal $E_8$ becomes true to halt further reading of the row and to prevent the outputting of the unread row of characters. True signal $E_8$ starts the program counter 80 to cause the unit 250 to read, in turn, each column position in a core array 200. The information read from each column position is stored in flip-flops M—M5 where it is checked. If the result indicates that the column position is full (contains a character) the information temporarily stored in flip-flops M1–M5 is written back into the column position. However, if the result indicates an empty column position, the program counter 80 is stopped. In turn the column counter 105 stops, and one of the respective lights 50 (FIG. 3) lights up to point out the character of the screen 41 which should be in the empty column. The operator writes the character into the flip-flops M1–M5 by pressing the respective key on the keyboard 42 shown schematically in FIG. 3 at the same time the program counter is started.

With the above functional description in mind, the construction and operation of the character identifying unit 250 shown in FIG. 8 will now be described. Signals A, B, C, and D, which are obtained from detector circuitry 38 in FIG. 4, are fed to one input of AND gates 62, 64, 66, and 68, respectively. The other input of each of these AND gates 62, 64, 66, and 68 is fed by the output 70a of another AND gate 70, which is in turn fed by the signals $N_1'$, $T_1'$, $E_8'$, $J_8'$, and $Q_1'$ to form the logical product thereof. It will be remembered from FIGS. 4, 6, and 7, that signals $N_1'$ and $T_1'$ fed to AND gate 70 are the false outputs of flip-flop N1 and the one-shot T1, respectively, the signal $N_1'$ being true only after a reference mark has been intercepted by aperture 22b, and the signal $T_1'$ being true only after the maximum time has elapsed for which the reference mark is permitted to occur after the apertures leave the shroud 24. As mentioned previously, the signal $Q_1'$ fed to AND gate 70 is the false output of one-shot Q1, while the signal $E_8'$ fed to AND gate 70 is the inverse of the signal $E_8$ generated by error counter 230 when eight scans have failed to read a row correctly. Finally, the signal $J_8'$ fed to AND gate 70 is the inverse of the signal $J_8$ generated by character counter 210 when all eight characters on a row have been read. Since the output 70a of AND gate 70 is true only when all of the above described inputs thereto are true, AND gates 62, 64, 66, and 68 are enabled to pass the pulses of signals A, B, C, and D only after the reference mark is detected by aperture 22b and only when the one-shot Q1 has not been switched true and the error signal $E_8$ or the final character signal $J_8$ is not present. By so restricting the feeding of signals A, B, C, and D to the remainder of the character identifying unit 250, the pulses produced by these signals A, B, C, and D during periods when they are not required are conveniently eliminated and prevented from interfering with system operation. To distinguish the output signals of AND gates 62, 64, 66, and 68 from the signals A, B, C, and D they are designated as $A_1$, $B_1$, $C_1$, and $D_1$, respectively.

The manner in which the signals $A_1$, $B_1$, $C_1$, and $D_1$ are used to uniquely determine the position of the zones U, V, W, X, and Y for each character will now be explained. Still referring to FIG. 8, it will be seen that the signals $A_1$, $B_1$, $C_1$, and $D_1$ are fed to an OR gate 72 whose output is, in turn, fed to the set or true input $g_1$ of a flip-flop G1 Thus, in the normal scanning of a row of characters (assuming that the reference mark has been detected by aperture 22b), flip-flop G1 will be switched to the true state when the first pulse produced by any one of the signals $A_1$, $B_1$, $C_1$, or $D_1$, in response to its respective aperture 22a, 22b, 22c, or 22d intercepting the vertical segment provided in zone U for each character. When flip-flop G1 is switched true, its true output $G_1$, which is fed to the "start" input of an oscillator 75, also becomes true, causing oscillator 75 to generate sine waves 71 at a predetermined frequency determined in accordance with system requirements. The oscillator 75 is so arranged that the sine waves start with a positive rise. The sine waves 71 are fed to a blocking oscillator 73 which is constructed and arranged similar to blocking oscillator 158 (FIG. 5) to cause clock signals $C_L$ preferably in the shape of sharp spikes to appear at the output in response to each negative-going zero crossing of the sine wave 71. The clock signals $C_L$ are fed to the advance input of the program counter 80 which is constructed and arranged to count, in response to each clock signal $C_L$. That is, when the output signal $P_1$ is high or true; the next clock signal $C_L$ switches output signal $P_2$ true and signal $P_1$ low or false; the next clock signal $C_L$ switches signal $P_3$ true and signal $P_2$ false; etc. Then, the fifth clock signal $C_L$, produced when signal $P_5$ is true, resets the program counter 80 whereby signal $P_1$ is switched true and signal $P_5$ is switched false. The repetition rate of the sine wave provided by oscillator 75 is chosen so that each program count signal represents a particular one of the five zones U through Y and when the program counter 80 is switched to program count $P_1$, apertures 22a, 22b, 22c, and 22d will have scanned past the first character. Since the first clock signal $C_L$ is formed after one half of a sine wave, the clock signals $C_L$ indicate the end of each of the five vertical zones U, V, W, X, and Y.

The Signal $P_5$ of program counter 80 is fed to the reset input $_0g_1$ of flip-flop G1 through AND gate 74, whose output is coupled to OR gate 76. The other inputs of AND gate 74 have fed thereto the clock signal $C_L$ and signal $K_8'$, the inverse of signal $K_8$ (signal $K_8$ is generated by column counter 105 to indicate that the last of the eight characters is being read). Therefore, flip-flop G1 will be switched back to its false state when the fifth clock signal $C_L$ is formed by the blocking oscillator 73 when reading each one of the characters in the row except when reading the last one. Then, the tenth clock signal $C_L$ switches flip-flop G1 to the false state. When flip-flop G1 switches false, the false output $G_1'$ of flip-flop G1, which is connected to the "stop" input of oscillator 75, will become true to stop oscillator 75 from producing sine waves and thereby cause program counter 80 to remain at its initial program count signal $P_1$ where it first started until one of the apertures 22a, 22b, 22c, or 22d next intercepts the vertical segment in zone U of the next adjacent character in the row.

In summary, therefore, the first one of the signals $A_1$, $B_1$, $C_1$, or $D_1$ which intercepts the vertical segment provided in zone U for each character (after the reference mark has been detected by aperture 22b), causes flip-flop G1 to become true to cause the oscillator 75 to generate sine waves 71 starting with a positive half cycle. Then, at the end of the first half cycle and every odd half cycle thereafter up to nine half cycles, the blocking oscillator 73 produces five clock signals $C_L$ to cause program counter 80 to count through program counts $P_1$ to $P_5$, starting and ending with the initial program count $P_1$, at which time the apertures 22a, 22b, 22c, and 22d will have scanned past the character. The program count signal $P_5$ is fed to the reset input of $_0g_1$ through AND gate 74 along with the clock signal $C_L$ and the inverse $K_8'$ of signal $K_8$ to ensure that the flip-flop G1 is switched false at the end of signal P₅ for each character in the row except the last or eighth character in the row wherein the program counter 80 cycles twice for reasons that will be explained hereinafter.

The relation of each character to program count signals $P_1$ to $P_5$ provided by program counter 80 in the manner just described, will be better understood with reference to FIG. 9, which is an enlarged view of the stylized character "2" showing the position of each vertical zone U, V, W, X, and Y with respect thereto. It will be remembered from the discussion of the previous paragraph that the first one of the apertures 22a, 22b, 22c, or 22d which intercepts the vertical segment provided in zone U for each character causes flip-flop G1 to be switched true to start oscillator 75 oscillating, and thereby cycle program counter 80 from its initial program count $P_1$ to program count $P_5$ and then back again to $P_1$. For the position of the apertures 22a, 22b, 22c, and 22d with respect to the numeral "2" shown in FIG. 9, it will be seen that the aperture 22b is the one which will first intercept the vertical segment 2a provided in zone U for the character "2" to cause a pulse to be produced by the corresponding signal $B_1$.

As was brought out previously, each pulse produced by signals $A_1$, $B_1$, $C_1$, and $D_1$, in response to the interception of a vertical character segment by a respective aperture, occurs substantially at the center line of the vertical segment. Thus, it can be accurately presumed that the pulse produced by signal $B_1$ in response to aperture 22b traversing the vertical segment 2a of character "2" in FIG. 9 occurs substantially at the center line 2b, which is also the center of zone U. Consequently, one program count is provided for each of the zones V, W, X, and Y, as shown by the waveforms $P_2$, $P_3$, $P_4$, and $P_5$, and the equivalent of a program count as shown by waveform $P_1$ is provided for zone U. The signal $P_1$ is switched to low output, or false when the apertures 22a, 22b, 22c, and 22d traverse the imaginary line dividing zone U and zone V. In order to achieve correct horizontal registration, that is, correct positioning of the zones U, V, W, X, and Y with respect to each character, the oscillator 75 is of the type that starts oscillating with a positive half cycle when it was switched on by signal $B_1$. The sine wave 71, shown in FIG. 9 is the sine wave as produced by the oscillator 75, and is shown in relative position with the stylized character "2" (the time ordinate is positive moving to the left of FIG. 9). Whenever the sine wave 71 passes the zero voltage line during the negative-going excursion, the blocking oscillator 73 produces a spike pulse as shown by waveform $C_L$, to accurately define the end of one vertical zone and the start of the next zone. Waveforms $P_2$, $P_3$, $P_4$ and $P_5$ as illustrated in FIG. 9 are high or true during the time their respective zones V, W, X, and Y are traversed by the apertures.

As was mentioned previously, each of the characters in the system is stylized to have at least one vertical segment in zone U. Thus, accurate horizontal positioning of the zones U, V, W, X, and Y for every other character in the system may be achieved in the same manner as explained with respect to the character "2" illustrated in FIG. 9. It may additionally be noted at this time that, since horizontal registration is determined in response to the detection of the center line of the vertical segment which is provided in zone U for each character (and is thus also the center line of zone U), the horizontal location of all vertical segments of a character need be controlled only with respect to the centers of their vertical segments, without regard to printing weight or segment width. This makes possible greatly reduced tolerances in character printing quality as well as in character dimensioning.

An additional point to recognize at this time is that because the program counter 80 cycles back to signal $P_1$ after the fifth clock signal $C_L$, the system is ready to read the next character even though it is horizontally registered relatively close to the preceding character, such as illustrated by characters "4" and "2" of row 48 in FIG. 2. During the scanning of a row, program counter 80 will be cycled in response to each character in the row and, as a result of such cycling, will provide accurate horizontal registration for each character (as described for the character "2" in FIG. 9), regardless of the horizontal spacing between characters. Thus, relatively large horizontal misregistrations, such as illustrated between characters "3" and "9" and relatively small horizontal misregistrations such as illustrated between characters "4" and "2" of row 48 in FIG. 2, can readily be handled without error.

Returning now to FIG. 8, it will be seen that signal $B_1$, corresponding to aperture 22b, is fed to one input of each of a first group of five AND gates 82, 84, 86, 88, and 90, while signal $C_1$ corresponding to aperture 22c is fed to one input of each of a second group of AND gates 92, 94, 96, 98, and 100. The other inputs of these two groups of AND gates are fed by respective ones of the program count signals $P_1$, $P_2$, $P_3$, $P_4$, and $P_5$, as shown, program count signal $P_1$ being fed to AND gates 82 and 92, program count signal $P_2$ being fed to AND gates 84 and 94, program count signal $P_3$ being fed to AND gates 86 and 96, program count signal $P_4$ being fed to AND gates 88 and 98, and program count signal $P_5$ being fed to gates 90 and 100.

The outputs of AND gates 82, 84, 86, 88, and 90 are fed to respective ones of the set inputs $f_1$, $f_2$, $f_3$, $f_4$, and $f_5$ of flip-flops F1, F2, F3, F4, and F5, while the outputs of AND gates 92, 94, 96, 98, and 100 are fed to respective ones of the set inputs $f_6$, $f_7$, $f_8$, $f_9$, and $f_{10}$ of flip-flops F6, F7, F8, F9, and F10. Consequently, in scanning a character, such as the character "2" illustrated in FIG. 9, flip-flops F1, F2, F3, F4, and F5 will be set in accordance with the presence or absence of character segments in each of the zones U, V, W, X, and Y, respectively, traversed by the aperture 22b, while flip-flops F6, F7, F8, F9, and F10 will be set in accordance with the presence or absence of character segments in each of the zones U, V, W, X, and Y, respectively, traversed by the aperture 22c. If a binary "1" indicates the presence of a vertical character segment and a binary "0" indicates the absence of a vertical character segment then, for the character "2" shown in FIG. 9, flip-flops F1, F2, F3, F4, and F5 would have the settings 10000, respectively, while F6, F7, F8, F9, and F10 would have the settings 00001, respectively. These binary codes correspond to the code of character "2" as shown in FIG. 1. It will be noted that flip-flops F1 to F10 are all caused to be re-set to their "0" settings by the logical product formed by program count signal $P_5$ and clock signal $C_L$ applied to the inputs of AND gate 69 whose output is applied to the reset inputs $_of_1$ to $_of_5$ and $_of_6$ to $_of_{10}$ thereof, in order to prepare them for receiving the next character information.

As each character in a row is scanned, flip-flops F1 to F10 will be set up in accordance with the presence or absence of character segments traversed by apertures 22b and 22c in each of the zones U, V, W, X, and Y. It next becomes necessary to provide means for determining the position of each character in the row. This position information is obtained by means of the column counter 105 (located in the lower central portion of FIG. 8) which is caused to advance one count, in consecutive numerical order, each time a character is scanned, by feeding the program count signal $P_2$ and the clock signal $C_L$ to an AND gate 106 whose output is fed to the "advance"

input of column counter 105 through an OR gate 107. particular advance input fed by signals $P_2$ and $C_L$ through AND gate 106 and through OR gate 107 is indicated as the

input, which provides for counting in consecutive numerical order. Also provided are "advance" inputs "P" and

the purpose of which will be described further on in this specification.

In order to ensure that the column counter 105 is initially at zero at the start of a scan of a row, the reference pulse $B_R$ is fed to the "reset" input of the column counter 105 through an OR gate 109 to reset column counter 105 to its zero count $K_0$. Consequently, since program counter 80 then cycles once for each character in the row, as a result of which, program count signal $P_2$ and clock signal $C_L$ advance column counter 105 one count for each character scanned, the count of the column counter 105 would indicate the position in the row of the character being scanned. The use of the four spaced apertures 22a, 22b, 22c, and 22d assures that, for each scan in which the reference mark is intercepted by aperture 22b, at least one of the four apertures will intercept the vertical segment provided in zone U for each character in the row, even in the presence of appreciable vertical misregistration between adjacent characters, such as illustrated occurring between the characters "7" and "1" in row 48 of FIG. 2. As a result, program counter 80 would reliably cycle for each character in the row, and the count of column counter 105 would identify the position in the row of the character being scanned.

It will be seen that at the end of signal $P_5$ the two five-digit binary numbers set up in flip-flops F1 to F5 and F6 to F10 are converted by a code converter 110 (FIG. 8) into a single five-digit binary number representative of the character scanned. It will be remembered that the stylizing has been chosen so that two reading errors are required in order to mis-identify a character. As a result, a single five-digit binary code can be derived from the two five-digit binary numbers obtained for each character which will be sufficient to represent the sixteen characters in the system shown in FIG. 1 and also provides one parity bit. The code converter 110 to which the true outputs $F_1$ to $F_5$ and $F_6$ to $F_{10}$ of flip-flops F1 to F5 and F6 to F10 are fed is provided for this purpose. By performing this conversion before operating further on the character information makes possible a considerable reduction in circuit complexity, since the data to be processed is reduced by one-half. Code converters, such as the ten-to-five code converter 110 illustrated in FIG. 8, may readily be provided by those skilled in the art.

As noted in the previous paragraph, code converter 110 is caused to operate to convert the character information set up in flip-flops F1 to F5 and F6 to F10, if the character is in a "read" scan position with respect to the apertures 22b and 22c, which are spaced in accordance with the spacing of $r_t$ and $r_b$ in FIG. 1. However, from the time that aperture 22b first detects a reference mark 46, apertures 22b and 22c will continuously intercept character information for each character during the progressive scanning of a row and cause flip-flops F1 to F10 to be set up in accordance therewith, even though the information detected will not be meaningful until the character is properly aligned for a "read" scan. In order to ignore the settings of flip-flops F1 to F10 until a "read" scan is performed on a character, code converter 110 is permitted to convert the settings of flip-flops F1 to F10 only in response to an energization signal on output 119a of AND gate 119 which signal is caused to occur at the end of signal $P_5$ if a "read" scan has been performed on the character scanned. By so controlling the operation of code converter 110, the character is transferred to flip-flops M1 to M5 at the same time that the flip-flops F1 to F10 are reset to the "0" state in preparation for scanning the next character in the row.

Aperture 22d provides a most advantageous way of determining whether or not apertures 22b and 22c are properly positioned for a "read" scan (along paths $r_t$ and $r_b$) of a character, in order to determine when code converter 110 is to be permitted to operate. This is accomplished by spacing aperture 22d with respect to apertures 22b and 22c so that apertures 22b and 22c will have substantially the correct alignment for a "read" scan of a character during the scan that aperture 22d completely misses the character for the first time. This condition is typically illustrated in FIG. 9. It has been found that by using this condition to determine when a "read" scan has been performed, significantly greater tolerances on character dimensions are possible, as compared to other approaches to vertical registration, for example, the counting of the number of times a character portion is detected. It is important to note that since aperture 22d is to be used for this purpose, it is necessary that the corresponding circuitry for producing signal $D_1$ provides the signal $D_1$ not only when a vertical segment is intercepted by aperture 22d, but also, when any portion of a character is intercepted thereby, such as the horizontal portion of 2d of the character "2" illustrated in FIG. 9. For this reason, the detector circuitry 38 illustrated in FIG. 4 is designed so that signal $D_1$ is produced when any portion of a character is detected. As will be understood by those skilled in the art, suitable means for this purpose may readily be provided in detector circuitry 38.

As mentioned previously, in order to control whether or not code converter 110 is to convert at the end of program count signal $P_5$, code converter 110 is energized only in response to the energization signal on output 119a. This energization signal is provided when the output 119a of an AND gate 119 becomes true. Program count signal $P_5$ is fed to AND gate 119 along with the clock signal $C_L$, the false output $E_1'$ of a flip-flop E1, and the false output $L_1'$ of a flip-flop L1, as shown in FIG. 8. Since signal $D_1$ corresponding to aperture 22d is fed to the set input $e_1$ of flip-flop E1 and if, during the scan of the character, the signal $D_1$ is produced in response to aperture 22d intercepting a portion of the character, flip-flop E1 will be switched to its true state. As a result $E_1'$ will become false, inhibiting AND gate 119 and thereby preventing operation of code converter 110. On the other hand, if aperture 22d fails to intercept any portion of the character scanned, so that no signal $D_1$ is produced, then flip-flop E1 will remain in its false state and its false output $E_1'$ will remain true. Thus, if signal $L_1'$ is also true (which is the case if this is the first time aperture 22d has failed to intercept any portion of the character scanned, as will hereinafter be described in detail), a "read" scan is indicated and the clock signal $C_L$ will pass through AND gate 119 to provide the energization signal. Code converter 110 will then convert the ten-digit binary number provided by the outputs $F_1$ to $F_{10}$ into a single five-digit binary number representative of the character scanned. It should be noted that flip-flop E1 is always switched false at the end of signal $P_5$ in order to be ready to read the next character. This is accomplished by feeding signals $P_5$ and $C_L$ to an AND gate 117 whose output is fed to the reset or false input $_0e_1$ of flip-flop E1.

The digits of the five-digit binary number thus provided by code converter 110 at the end of program count signal $P_5$, in response to a "read" scan, are fed through respective OR gates 112, 114, 116, 118, and 120 to be set up in respective ones of flip-flops M1 to M5. Then, at the end of program count signal $P_1$, determined when the next character is being read, the binary digits stored in the respective flip-flops M1 to M5 are applied through respective AND gates 122, 124, 126, 128, and 130 to respective row drivers 121 for the memory core array 200. The clock signal $C_L$ at the end of signal $P_1$ effectively opens AND gates 122, 124, 126, 128, and 130, since AND gate 125, whose output feeds the other input of each of AND gates 122, 124, 126, 128, and 130, is in turn fed by clock signal $C_L$, program count signal $P_1$, and the false output $Q_1'$ of one-shot Q1, whose false output $Q_1'$ is normally true. Row drivers 121 are constructed and arranged so that each driver, which is coupled to any one of the flip-flops M1 to M5 that is set to the "1" state, will cause, at the end of program count signal $P_1$, one-half write select current to be applied to a respective row drive line 129, that is coupled to the row driver, and to the row of cores of the memory core array 200. However, the drivers 121 that are coupled to the flip-flops which are set to the "0" state will apply no current to the respective row drive line 129 of its corresponding row of cores.

Memory core array 200 is comprised of eight columns of cores, each column having five cores. The eight colums of cores respectively correspond to the eight characters in each row on the tape 12 (FIG. 2), and the five cores in each column provide for the storage of a five-digit binary number representative of a respective character on the row after a "read" scan has been performed thereon. At the end of program count signal $P_1$, in addition to the one-half write select current being applied to those rows of cores whose corresponding M1 to M5 flip-flops are set to the "1" state (as described in the previous paragraph), a particular column of cores in array 200, corresponding to the count of column counter 105 (which count still corresponds to the column position of the character stored in flip-flops M1 to M5 even though apertures 22a, 22b, 22c, and 22d have intercepted the following character), also receives half-select write current applied thereto. If, for example, the character in the first column position has been read and stored in flip-flops M1 to M5, the column counter 105 has been set to count $K_1$ when signal $P_2$ was formed during the reading of the character. Then, when the character in the second column position is being read, signal $P_1$ is formed and the first column of cores in array will receive one-half write select current at the end of signal $P_1$, causing those cores in the first column which also receive one-half write current from a corresponding M1 to M5 flip-flop to receive a total of full write select current to switch these cores from the "0" to the "1" state, the other cores in the first column as well as all the other cores in the array 200 receiving no greater than one-half write select current and thereby remaining essentially undisturbed. In the meantime, the ten bits for the character in the second column position is being stored in flip-flops F1 to F10.

It will thus be understood that the five-digit binary number set up in flip-flops M1 to M5 by code converter 110 at the end of program count signal $P_5$, in response to a "read" scan performed on a character scanned, will thereby be transferred, at the end of program count signal $P_1$, generated while the next character is being read, to the respective column of cores in array 200. In a similar manner, the five-digit binary number corresponding to every other character in the row, which is likewise set up in flip-flops M1 to M5 as a result of a "read" scan being performed thereon, is recorded in a respective column of cores in array 200 corresponding to the position of the character in the row.

The specific manner in which half-select write current is applied to the column of cores of memory core array 200 in accordance with the count of column counter 105 will now be explained in detail. Each of the outputs $K_0$, $K_1$, $K_2$, etc., of column counter 105, when true is a positive signal which when inverted by its respective inverter I and fed through a base resistor to the base of its respective normally cut off transistor 137 causes transistor 137 to turn on and thereby effectively ground, through the grounded transistor emitter, the write and read column drive lines 133 and 135 connected to the transistor collector. The write column drive line 133 passing through each column of cores is the only one that need be considered at this time and it will be seen that the opposite end of each write column drive line 133 is fed through a respective diode 131 to the emitter of a normally cut-off write transistor 141. The collector of transistor 141 is connected to a D-C voltage $-V_1$ through a collector resistor 142, and the base of transistor 141 is connected through a base resistor and an inverter I to the output 140a of an AND gate 140. When the clock signal $C_L$ appears at the end of signal $P_1$, it passes through AND gate 140 (since $Q_1'$ also fed to AND gate 140 is normally true) to turn on transistor 141 and thereby cause a current to flow in the column drive line 133 whose transistor 137 has been turned on by the count of column counter 105. The value of $-V_1$ and collector resistor 142 is chosen so that the current flowing in the selected column drive line 133 is equal to one-half the write select current required to switch a core in array 200 from the "0" to the "1" state and, when added to the additional one-half write select current applied to those cores of the selected column whose M1 to M5 flip-flops are set to the "1" state, causes the settings of flip-flops M1 to M5 to be transferred, at the end of the program count signal $P_1$ to the column of cores in array 200 corresponding to the position in the row of the character scanned.

It should now be evident just how the five-digit binary number provided at the output of code converter 110 at the end of program count signal $P_5$, in response to a "read" scan performed on the character scanned, is set up in flip-flops M1 to M5 and then, recorded in a column of the memory core array 200 corresponding to the position of the character in the row while the system is reading the next character in the row. With this explanation as background, the purpose of flip-flop L1, whose false output $L_1'$ also determines whether or not the code converter 110 will operate at the end program count signal $P_5$, will now be understood as follows. It will be appreciated that once a particular character has a "read" scan performed thereon and an identifying five-digit binary number recorded in a respective column of cores of memory core array 200, aperture 22d will still fail to intercept any portion of a character as scanning progresses. Thus, the false output $E_1'$ of flip-flop E1 will remain true and, if no other provision were available, would cause code converter 110 to operate, even though apertures 22b and 22c would no longer traverse the paths $r_t$ and $r_b$ corresponding to a "read" scan. As mentioned previously, aperture 22d indicates a "read" scan only when it first fails to intercept a portion of the character scanned. Thus, to prevent upsetting a properly recorded five-digit binary number in memory core array 200, it is necessary to determine whether or not a "read" scan has already been performed on a particular character, in which case, a five-digit binary number would be already recorded in the respective column of array 200. If so, the code converter 110 should be prevented from operating, since apertures 22b and 22c would no longer be in the correct position for a "read" scan. Therefore, during the cycling of program counter 80 such as at the end of signal $P_3$ for the character being read, a read operation is performed on the array 200 to read out the five-digit binary number recorded in the column corresponding to the position of the character in the row.

Since column counter 105 has already been set, at the end of program count signal $P_2$, to a count corresponding to the character being scanned, readout from the five cores in the corresponding column in array 200 is conveniently accomplished at the end of signal $P_3$ by applying program count signal $P_3$ and clock signal $C_L$ to the inputs of an AND gate 149 whose output is coupled through OR gate 150 and an inverter I to turn on a normally cut off read-transistor 151, whose collector is connected to a D-C voltage $-V_2$ through collector resistor 152, and whose emitter is connected to each read column drive line 135 through a respective diode 139. At the end of the program count signal $P_3$, therefore, current will flow through the read column drive line 135 whose respective transistor 137 has been turned on by column counter 105, the value of $-V_2$ and the collector resistor 152 being chosen so that the current flowing in the selected read column drive line 135 is equal to full read select current. It should be noted that column counter 105 has been advanced at the end of signal $P_2$ so that now the count on the column counter represents the column of the character being read. Thus, if any of the cores in the selected column are in the "1" state, the full read select current flowing therethrough causes these cores to be switched to the "0" state, as a result of which, a pulse is induced in each row sense line 143 corresponding thereto. Each such induced pulse is then amplified by respective sense amplifiers 163 to provide signals $S_1$, $S_2$, $S_3$, $S_4$, and $S_5$ which correspond to the five-digit number read out of the five cores in the selected column, the presence of a pulse designating 1 binary "1" and the absence of a pulse designating a binary "0." These signals $S_1$, $S_2$, $S_3$, $S_4$, and $S_5$ are then fed through respective AND gates 172, 174, 176, 178, and 180 (since $Q_1'$ and $J_8'$ produce a true signal on output of AND gate 168 which signal is fed through OR gate 181 to the other input of each of these AND gates) and fed through respective OR gates 112, 114, 116, 118, and 120 to set up respective ones of the flip-flops M1 M2, M3, M4, and M5 in accordance therewith.

In summary, therefore, it will be understood that at the end program count signal $P_3$, the data stored in the column of cores in array 200, corresponding to the column position of the character being scanned, is read out of array 200 and set up in respective ones of flip-flops M1 to M5. It will be noted that flip-flops M1 to M5 were cleared when program count signal $P_1$ and the clock signal $C_L$ pass a true signal through AND gate 148 and, in turn, through OR gate 199 to the reset inputs $_nm_1$ to $_nm_5$ of flip-flops M1 to M5. Flip-flops M1 to M5 are cleared preparatory to their being set up at the end of program count signal $P_3$, in accordance with the data stored in the selected column of cores in array 200.

Now referring specifically to flip-flop L1, it will be seen that the true outputs $M_1$, $M_2$, $M_3$, $M_4$, and $M_5$ of respective flip-flops M1 to M5 are each fed to an OR gate 179, whose output is fed to an AND gate 182 along with program count signal $P_4$ and clock signal $C_L$, the output of AND gate 182 being in turn fed to the set input $1_1$ of flip-flop L1 through OR gate 185. Thus, if any of the flip-flops M1 to M5 were set in the "1" state at the end of program count signal $P_3$, in response to a "1" being recorded in a respective core of the column of cores selected by column counter 105, then flip-flop L1 will be switched to the true state at the end of program count signal $P_4$. This occurs because, if flip-flops M1 to M5 contain a binary number when at least one of the outputs $M_1$ to $M_5$ is true, AND gate 182 will be enabled to permit the clock signal $C_L$, formed at the end of program count $P_4$, to pass therethrough to be applied to set input $1_1$. Flip-flop L1 is switched to the true state, and output $L_1'$ of flip-flop L1 then is false.

It will be understood, therefore, that if a "1" is recorded in any core of the column of cores in array 200, corresponding to the position in the row of the character being scanned, $L_1'$ will become false in the manner described in the previous paragraph. Since a "1" can be placed in a core of a column in array 200 only if a five-digit binary number corresponding to a character is recorded therein (since the five-digit numbers add up to odd parity, there is no such character in the system whose five-digit binary number consists of five binary zeros), then the fact that $L_1'$ is false at the end of signal $P_5$ will indicate that the particular character being scanned has already been read and recorded in its respective column. With $L_1'$ then false, the clock signal $C_L$ at the end of signal $P_5$ is prevented from passing through AND gate 119 and the energization signal will not appear on output 119a to energize code converter 110, even though $E_1'$ is true as a result of aperture 22d failing to intercept any portion of the character scanned.

If, however, outputs $M_1$, $M_2$, $M_3$, $M_4$, and $M_5$ are all zero at the end of program count signal $P_4$, indicating that the character has not been recorded in its respective column in array 200, then flip-flop L1 will remain in the false state since it has been set false by signals $C_L$ and $P_1$ fed to AND gate 146 at the end of program count signal $P_1$. Signal $L_1'$ will be true at the end of program count signal $P_5$ to permit code converter 110 to be operated if, of course, $E_1'$ is also true, indicating that aperture 22d has failed to intercept any portion of the character scanned. Consequently, code converter 110 can operate at the end of program count signal $P_5$ only if the two conditions of a "read" scan are both present; that is, (1) if aperture 22d has failed to intercept any portion of the character scanned so that $E_1'$ is true at the end of signal $P_5$ and (2) if the character has not been already read and recorded in its respective column of array 200 so that $L_1'$ is also true at the end of signal $P_5$. Or, stated another way, a "read" scan has occurred if this is the first time aperture 22d has failed to intercept any portion of the character scanned.

Returning temporarily to a consideration of the memory core array 200 once more, it will be remembered that, at the end of program count signal $P_3$, the column of cores corresponding to the column position in the row of the character being scanned was read out and set up in flip-flops M1 to M5. All of the cores in the selected column will thus now be in the "0" state because of the destructive read-out inherent in a magnetic core memory. Consequently, if the column of cores, read out of array 200 at the end of program count signal $P_3$, stored a five-digit number corresponding to a recorded character, it is necessary that this five-digit number be written back into the selected column, or it will be lost. Fortunately, this may readily be accomplished in the character identifying unit 250 of FIG. 8, since the five-digit binary number set up in flip-flops M1 to M5 at the end of program count signal $P_3$ will still be present when the program counter 80 is again cycled to rewrite back into array 200 at the end of signal $P_1$ because the flip-flops M1 to M5 are not yet cleared. Thus, at the end of program count signal $P_1$, AND gate 125 passes the clock signal $C_L$ and the five-digit binary number represented by the settings of flip-flops M1 to M5 will automatically be returned to its respective column of cores in array 200, just as if a new five-digit number corresponding to a character was just being recorded in its respective column.

In summary, therefore, it will be understood that the settings of flip-flops M1 to M5 are always transferred at the end of program count $P_1$ that is generated while the next character in the row is being read (unless $Q_1'$ is false) to the column of cores selected by column counter 105. If the character being scanned has already been read and recorded in its respective column, then the five-digit number, already recorded in the cores of the respective column, is set up in the flip-flops M1 to M5 at the end of program count signal $P_3$ and remains undisturbed at the end of program count signal $P_5$ when code converter 110 does not operate, whereupon, at the end of program count signal $P_1$ (formed while reading the next character) the five-digit number in flip-flops M1 to M5 is again transferred back to its respective column.

If, however, no five-digit number is stored in the respective column of the character being scanned so that all "0's" are set up in flip-flops M1 to M5 at the end of program count signal $P_3$, $L_1'$ is true at program count signal $P_4$ and two situations are then possible. First, if aperture 22d has failed to intercept any portion of the character scanned and $E_1'$ remains true along with $L_1'$ to indicate that a "read" scan is being performed, then at the end of program count signal $P_5$, flip-flops M1 to M5 will be set by code converter 110 to the five-digit binary number corresponding to the character scanned. At the end of program count signal $P_1$, this five-digit binary number will then be transferred to the column or cores in array 200 corresponding to the position of the character in the row. Second, if aperture 22d has intercepted a portion of the character scanned so that $E_1'$ is set false even though $L_1'$ is true, thereby indicating that a "read" scan was not performed, code converter 110 will then not operate at the end of program count signal $P_5$ and flip-flops M1 to M5 will remain set to all "0's" so that, at the end of program count signal $P_1$, the same "0" settings read out of the selected column of cores in array 200 are written back into the selected column, and the column will continue to indicate that no character is recorded therein.

It should be noted that the system reads and records each character in the row in the manner just described, except that when the last or eighth character is read and recorded, the program counter 80 cycles twice before it stops at count $P_1$. It should be remembered that during the first cycle of the program counter 80 for the eighth character, the character is read either from the tape 12 or the eighth column of the core array 200 and transferred to the flip-flops M1 to M5. During the second cycle of the program counter the character is transferred from the flip-flops M1 to M5 to the eighth column of the core array 200 at the end of program count signal $P_1$. At the end of program count signal $P_2$ the column counter 105 is advanced to count $K_9$ and rests there until the counter 105 is reset.

Now that the means for reading and recording a typical character in array 200 has been explained, the manner in which outputting of a row of characters is achieved after all eight characters in the row have been read and recorded will be understood from the following further description of the character identifying unit 250. Referring again to code converter 110, it will be seen that, in addition to providing a five-digit binary output to flip-flops M1 to M5 at the end of program count signal $P_5$ in response to a "read" scan, code converter 110 also provides a code correct signal Vc, which is obtained in response to energization signal formed on the output 119a of AND gate 119 and the outputs $F_1$ to $F_{10}$ of flip-flops F1 to F10. When present, at the end of program count signal $P_5$, code correct signal Vc indicates that a valid ten-digit binary number was obtained in response to the "read" scan performed on the character scanned, that is, that the combination of the outputs $F_1$ to $F_{10}$ provided by the "read" scan is a valid character combination. It will be appreciated by those skilled in the art that code correct signal Vc can readily be provided by suitably combining the signal on output 119a and signals $F_1$ to $F_{10}$ by means of well-known logical circuitry, such as illustrated in the typical embodiment of code converter 110 in FIG. 10.

Since code correct signal Vc occurs only when a "read" scan has been performed on a character and a valid character combination is set up in flip-flops F1 to F10, the signal Vc may conveniently be fed through an OR gate 187 to the "advance" input of a character counter 210 to permit a count to be maintained of the number of characters on the row which have had a proper "read" scan performed thereon and, thus, have been recorded in respective columns of memory core array 200. When character counter 210 reaches its eighth count, a positive (true) signal $J_8$ is produced to indicate that all eight characters on the row have been properly read and recorded and that the row is now ready for outputting. To output the characters, the tape 12 is stopped by causing flip-flop H1 to switch true when signal $J_8$ becomes true. This is accomplished by feeding signal $J_8$ through an OR gate 123 to one input of an AND gate 127, which is in turn fed to the set input $h_1$ of flip-flop H1, the other input of AND gate 127 being fed by the signal $B_R'$, which is derived as explained in connection with FIG. 4. Signal $B_R'$ insures that the row of characters stops in alignment with the slot 19 (FIG. 1) so that the optical back up means 30 may operate in the manner to be described hereinafter.

As shown in FIG. 6, the signal $B_R'$ will not be true while aperture 22b continues to intercept the reference mark 46 during progressive scanning of the row. Thus, the output of AND gate 127 will remain false until scanning of the row progresses to a point where aperture 22b finally fails to intercept the reference mark, for example, as shown in FIG. 7. In the scan for which this occurs, $B_R'$ becomes true and since $J_8$ is also true, the output of AND gate 127 becomes true to switch flip-flop H1 to the true state. As a result, true output $H_1$ of flip-flop H1 become true while false output $H_1'$ becomes false, which true signal $H_1$ energizes solenoid 31 (FIG. 3) to lift the idler roller 34 off the tape 12 to halt the tape. At the same time the operation of the ouput clock 215 is initiated since signals $H_1$, $J_8$, and $E_8'$ (the inverse of signal $E_8$) are fed to AND gate 214 whose output is coupled to the start input of output clock 215.

Also, as a result of flip-flop H1 being switched true, read transistor 151 associated with memory core array 200 is turned on by signals $H_1$ and $J_8$, coupled to the inputs of AND gate 212 whose output is coupled to OR gate 150. Before flip-flop $H_1$ switches true, the signal $B_R$ has reset the column counter 105. Also, AND gate 70 is inhibited, which in turn inhibits AND gates 62, 64, 66, and 68, to prevent unwanted pulses from appearing in signals $A_1$, $B_1$, $C_1$, and $D_1$ once signal $J_8$ appears. In addition, when signal $B_R'$ becomes true, flip-flop N1 (FIGS. 4 and 6) remains true, since there will be no reference mark signal $B_R$ to switch it false; thus, $N_1'$ becomes false to continue to effectively inhibit AND gate 70. Thus, as a result of character counter 210 reaching $J_8$ and flip-flop H1 thereby being switched true, scanning is halted, the column counter is reset, possible interfering signals are eliminated, and preparation is made to output the eight characters recorded in the eight columns of memory core array 200. Signal $J_8$ remains true until the row is outputted because signals $H_1$, $K_9$, and $J_8$, coupled to AND gate 211 are all true only after the row is outputted.

When output clock 215 is initiated into operation by the true signal appearing on the output of AND gate 214, clock pulses are produced at a predetermined rate by output clock 215 which are fed to one input of each of AND gates 216, 217, 218, and 219, as shown in FIG. 8, to advance the column counter 105. Since column counter 105 has been reset to its zero count $K_0$, AND gate 219, to which $K_0$ is fed along with the clock pulses of output clock 215, will permit the first output clock pulse to pass therethrough to the "advance"

input of column counter 105 by way of OR gate 107. As mentioned previously, column counter 105 is constructed and arranged so that signals applied to its "advance"

input cause counter 105 to count consecutively. Thus, the first clock pulse from output clock 215 will pass through AND gate 219 and OR gate 107 to advance column counter 105 to count $K_1$. As a result, the respective transistor 137 of count $K_1$ will be turned on to effectively ground read column drive line 135, causing full select read current to flow therethrough, since read transistor 151 has already been turned on by signals $H_1$ and $J_8$. Thus, the five-digit binary number stored in the first column of cores of array 200, which corresponds to the character in the row adjacent the reference mark 46 (FIG. 2), will be read out of the array 200 to provide respective sense amplifier output signals $S_1$, $S_2$, $S_3$, $S_4$, and $S_5$, respectively corresponding thereto. As mentioned previously, the presence of a pulse in one of the sense amplifier signals $S_1$, $S_2$, $S_3$, $S_4$, and $S_5$ indicates a binary "1" stored in the corresponding core of the selected column, while the absence of a pulse indicates a binary "0" stored therein.

The sense amplifier signals $S_1$, $S_2$, $S_3$, $S_4$, and $S_5$, representing the character in the row adjacent the reference mark, which are thus obtained as a result of the first clock pulse of output clock 215, are then fed to output equipment 252 through respective AND gates 182, 184, 186, 188, and 190 (which are enabled, since $H_1$, $J_8$, and $E_8'$ fed to AND gate 214 are true). In addition to being outputted, these signals $S_1$, $S_2$, $S_3$, $S_4$, and $S_5$ are also fed through AND gates 172, 174, 176, 178, and 180 (which are enabled, since $H_1$, $J_8$, and $K_1$ feeding AND gate 220 are true) and then through respective OR gates 112, 114, 116, 118, and 120 to cause flip-flops M1 to M5 to be set up in accordance therewith.

With outputs $M_1$ to $M_5$ of flip-flops M1 to M5 thus set up in accordance with the first character in the row adjacent the reference mark, the outputs $M_1$ to $M_5$ thereof are next applied to output logic circuitry 275 through respective AND gates 192, 193, 194, 195, and 196 (which are enabled since $J_8$, $H_1$, and $E_8'$ fed to AND gate 214 are true and the output of AND gate 214 is also fed to the inputs of these AND gates). A true output is then caused to appear at one of the three outputs $$( \text{Ю} ), (P), \text{or} (\Psi)$$

of output logic circuitry 275, the particular one of the three outputs $$( \text{Ю} ), (P), \text{and} (\Psi)$$

which is caused to be true being determined in accordance with the settings of flip-flops M1 to M5, which settings will represent the corresponding characters $$\text{"Ю"}, \text{"P"}, \text{or} \text{"}\Psi\text{"}$$

For example, as explained in connection with FIG. 2, if the settings of flip-flops M1 to M5 represent the character $$\text{Ю}$$

indicating that the first character in the row adjacent the reference mark is an $$\text{Ю}$$

as in row 44 of FIG. 2, the $$\text{Ю}$$

output of output logic circuitry will become true.

All of the above occurs in response to the first clock pulse provided by output clock 215, as a result of which column counter 105 was advanced to count $K_1$. Since the outputs $$( \text{Ю} ), (P), \text{or} (\Psi)$$

of output logic circuitry 275 are fed to respective AND gates 216, 217, and 218, the only one of these AND gates, which will be enabled by hte output clock 215, is the one corresponding to the character adjacent the reference mark. Thus, after the first clock pulse, the following clock pulses provided by output clock 215 can pass only through the enabled AND gate to the correspondingly labeled "advance" input of column counter 105. For example, if output $$\text{Ю}$$

of output logic circuitry 275 becomes true because the character $$\text{Ю}$$

is adjacent the reference mark, as in row 44 of FIG. 2, the clock pulses following the first one will be fed only to "advance" input $$\text{Ю}$$

of column counter 105.

Column counter 105 is constructed and arranged so that each of the advance inputs $$( \text{Ю} ), (P), \text{and} (\Psi)$$

thereof causes counting from the first count $K_1$ in a different predetermined manner, all of which, however, have $K_9$ as the final count. The advance input $$\Psi$$

for example, causes counting in consecutive numerical order, that is, $K_1$, $K_2$, $K_3$, $K_4$, etc. The advance input (P), on the other hand, may provide for counting in the reverse order $K_1$, $K_8$, $K_7$, $K_6$, $K_5$, $K_4$, etc. to $K_9$. It will be noted that, since the zero count $K_0$ of column counter 105 is fed to AND gate 219, after the first clock pulse of output clock 215 passes therethrough to advance column counter 105 to count $K_1$, no further clock pulses will be able to follow this route. Thus, the counting of column counter 105 will be determined only by the "advance" input $$( \text{Ю} ), (P), \text{or} (\Psi)$$

effectively selected by output logic circuitry 275.

It will now be understood that, as column counter 105 counts in response to each clock pulse, the column of cores in array 200 corresponding to each count will be outputted to output equipment 252 in the same way as described for the column of cores corresponding to count $K_1$. However, it will be noted that AND gates 172, 174, 176, 178, and 180 are enabled only during count $K_1$ because of $K_1$ being fed to AND gate 220 along with $H_1$ and $J_8$. Thus, flip-flops M1 to M5 will remain set to the first character in the row, and the particular output $$( \text{Ю} ), (P), \text{or} (\Psi)$$

of output logic circuitry 275 which is selected in accordance therewith will remain true during the counting operation. It will also be noted that since $N_1'$ remains false during outputting, no pulses can appear in signals $A_1$, $B_1$, $C_1$ or $D_1$, and flip-flop G1 will thereby remain false to prevent program counter 80 from cycling and interfering with character read-out. It will be appreciated by those skilled in the art that, by permitting the read-out of the characters on each row to be determined in accordance with a particular one of the characters on the row, as just illustrated, the versatility of the system is significantly increased. It will be appreciated that the repetition rate of the clock pulses provided by ouput clock 215 will ordinarily be chosen in accordance with the operating rate of output equipment 252.

As noted previously, count $K_9$ will be the final count of column counter 105, regardless of which "advance" input is selected, and is thus conveniently used to return the system to normal scanning operation, since outputting will have then been completed. The tape is started by feeding count $K_9$ to AND gate 201 along with signals $P_1$ and $J_8$ to reset flip-flop H1. At the same time, signals $H_1$, $K_9$, and $J_8$ are true and the character counter 210 is reset since AND gate 211 passes a true signal. After flip-flop H1 is reset, flip-flops M1 to M5 are cleared since AND gate 261 passes a true signal to OR gate 199. Scanning is continued from where it has been halted when signal $B_R'$ has become true. Since aperture 22b is thus between two adjacent rows of characters when scanning is resumed, the system will remain inactive until aperture 22b intercepts the reference mark of the next row, at which time, the reference mark signal $B_R$ will reset column counter 105 back to its zero $K_0$. Scanning of this next row and each following row then proceeds in the same manner as has been described above.

Having described the normal operation of the character identifying unit 250 of FIG. 8, the operation thereof when an error is detected will next be considered. For this purpose it will be assumed that a "read" scan has been performed in scanning a particular one of the characters in a row during program count signals $P_1$ to $P_5$, but the settings of flip-flops F1 to F10 do not represent a valid character combination, so that an error is indicated. In such a situation, code converter 110 is constructed and arranged to remain inoperative even though the signal on output 119a is true at the end of signal $P_5$, thereby causing flip-flops M1 to M5 to remain at their "0" settings. In addition, no code correct signal $V_c$ is provided. Instead, code converter 110 provides a code error signal $V_e$ to indicate that an error has occurred during a "read" scan. As will be appreciated by those skilled in the art, logical circuitry for combining signals $F_1$ to $F_{10}$ and the signal on output 119a to provide the error signal $V_e$ and to prevent conversion can readily be incorporated in code converter 110. Such typical circuitry is illustrated in FIG. 10 and will be described in detail further on in this specification.

The code error signal $V_e$ thus generated is fed through an OR gate 233 to a false input $_0z_1$ of a flip-flop Z1 to switch flip-flop Z1 to the false state to indicate that at least one of the characters in the row was not decoded. A second error signal $V_e$ produced during the scanning of the row keeps flip-flop Z1 in the false state. Since the error signal $V_e$ has been produced, the tape should be stopped, to perform the rescanning operation mentioned before, and it should be stopped when the row of characters is correctly aligned with slot 19 (FIG. 3) in support 15. This condition is indicated by true signal $B_R'$. Therefore, signal $Z_1'$ is fed to OR gate 123 and in turn to AND gate 127 so that, when signal $B_R'$ becomes true, the flip-flop H1 is switched true, and the tape 12 stops with the row of characters containing the error correctly aligned within the slot 19. The information stored in the core array 200 is not outputted to the output equipment 252 since AND gate 214 is inhibited by false signal $J_8$. Now the system is ready to rescan the row to try to fill in the blank columns in the core array 200. Rescanning as mentioned before is performed by energizing solenoid 56 (FIG. 3) to pivot mirror 29 about axis 51. To do this one-shot Q1 is to be switched true. Therefore, signals $Z_1'$, $H_1$, $E_8'$, and $K_0$ are fed to the inputs of an AND gate 231 whose output is fed to the set input $q_1$ of one-shot $Q_1$. The logical product of these signals is used to switch the one-shot $Q_1$ true because true signal $Z_1'$ indicates an error has been made; $H_1$ indicates the tape is stopped; $K_0$ indicates the start of a new scan; and signal $E_8'$ indicates that eight scans have not been attempted. Flip-flop Z1 is still in the false state because AND gate 241 does not pass a true signal to true input $z_1$ until after flip-flop H1 has been switched true by true signal $B_R'$. When signal $Q_1$ becomes true, the error counter 230 is advanced one count since the true output of one-shot Q1 is coupled to the advanced input of error counter 230. Also when the one-shot Q1 is switched true, true signal $Q_1$ energizes solenoid 56 (FIG. 3) by a suitable driver (not shown) to cause mirror 29 to rotate clockwise (as viewed in FIG. 3) about the axis 51 in a manner to be hereinafter described. After a predetermined time the one-shot Q1 switches false which time is sufficient to cause the mirror 29 to move the image of the character row a sufficient distance upward on the drum 20 (in the opposite direction from which arrow 40 points). When signal $Q_1$ is false, solenoid 56 is deenergized and the tension spring 57 in the optical back-up means 30 causes the mirror 29 to rotate counter-clockwise on axis 51, in turn, causing the image on the drum 20 to move in the direction of arrow 40. It should be noted that the means 30 includes a dashpot 58 which causes the motion of the image on the drum along the direction of the arrow 40 to stimulate the movement of the tape 12 in the direction of arrow 11. The means 30 will be described in greater detail hereinafter. The drum 20 is rotating; AND gate 70 (FIG. 8) is not inhibited by signals $E_8'$, $J_8'$, and $Q_1'$; and reading is performed when signals $N_1'$ and $T_1'$ become true in the manner described above. Due to the loose tolerances in the system, the rescan can be expected to be different. Consequently, if the character was misread because a portion of the character was absent, such as illustrated by the character "7" in row 52 of FIG. 2, it is quite possible that, when a "read" scan is again indicated, during the rescan, the position of the character "7" will be such that the portion of the vertical segment of the character "7" which is present will now be intercepted to permit the character to be properly read.

It should be noted that those characters in the row which have already been correctly read and, thus, are recorded in their respective columns of cores in array 200, are not disturbed during this error detection and, therefore, need not be re-read during the rescan. Consequently, an error is avoided which could occur if one of the previously read characters has a portion missing which could cause an error on the rescan. It should also be noted that when $Q_1'$ is false, AND gates 70 and 140 to which $Q_1'$ is fed will be inhibited while the solenoid 56 is energized to back up the image along the drum axis, thereby eliminating unwanted pulses in signals $A_1$, $B_1$, $C_1$, and $D_1$ and preventing program counter 80 from cycling and interfering with the error detection.

If in rescanning, the misread character is again read improperly, or another error is detected, another signal $V_e$ is produced by code converter 110 to switch flip-flop Z1 false. In turn, when the column counter 105 is reset by true signal $B_R$, and gate 231 passes a true signal, and one-shot Q1 is switched true to rescan the row and to advance error counter 230 to its second count. When one-shot Q1 is switched to the true state, the above described opertion is repeated. However, now flip-flop Z1 is set false and is not switched true until true signal $Q_1$ causes the mirror 29 to move the reference mark 46 out of the way of the aperture 22b, thus producing a true signal $B_R'$. If, after eight scans, a row still cannot be properly read, error counter 230 will have advanced to its eight count to cause $E_8$ to be true. Signal $E_8'$, therefore, will be false, to inhibit AND gate 231 so as to prevent true signal $Z_1'$ from passing therethrough to initiate another rescan. This assures that eight scans are performed on the same row of characters before the row is assumed to be unreadable. it should be noted that more or less rescans could be provided if the situation requires it. The false signal $E_8'$ also inhibits AND gate 70.

No outputting can be performed because AND gate 214 is inhibited by false signals $E_8'$ and $J_8$, in turn, inhibiting AND gates 182, 184, 186, 188 and 190. Outputting of the information in core array 200 is performed when all the columns of cores in the core array 200 have information stored therein. Signal $E_8$ being true when signal $J_8$ is false indicates that there are empty columns of cores in core array 200, i.e., no information is stored in one or more columns. In this embodiment, the purpose of the keyboard 42 (FIG. 3) is to provide a means for placing the correct character code in each empty column in array 200, and the purpose of the screen 41 is to provide a means for displaying which character or characters are to be placed in the core array 200.

To detect which one of the core columns is empty, the core array 200 is to be read column by column, by cycling the column counter 105. Column counter 105 was reset to count $K_0$ before signal $E_8$ was switched true by signal $B_R$. Readout is readily accomplished by utilizing flip-flop L1 which has been used to indicate when a column of cores in array 200 contains a code. To again cycle column counter 105, flip-flop L1 is switched true by signals $E_8$, $Q_1$, and $G_1'$ passing a signal through AND gate 351 whose output is coupled to OR gate 185. Then true signal $L_1$ enables AND gate 340, since signal $E_8$ is also true to switch flip-flop G1 true starting the oscillator 75. The output of AND gate 340 is coupled to one of the inputs of the OR gate 72. In turn, blocking oscillator 73 produces clock signals $C_L$ to cause the program counter 80 to count. Then, in the manner described above, at the end of signal $P_1$ AND gate 146 passes a true signal and flip-flop L1 switches false, AND gate 351 does not pass a signal to switch flip-flop L1 back to the true state because signal $G_1'$ is now false. Signal $Q_1$ is coupled to AND gate 351 to cause flip-flop L1 to be switched true by signal $E_8$ only after signal $E_8$ was first switched true. At the end of signal $P_2$ the column counter 105 is advanced to count $K_1$ and at the end of signal $P_3$ the first column of the core array 200 is read. Since AND gate 168 passes a true signal the coded information is transferred to and stored in flip-flops M1 to M5. This column may or may not have information stored therein. First, if there is information stored therein, flip-flop L1 is switched true at the end of signal $P_4$ because OR gate 179 passes a true signal to enable AND gate 182. When flip-flop L1 is true, flip-flop G1 is held in the true state so that the program counter 80 cycles again. Second, if there is no information stored in the first column of the core array, OR gate 179 would not pass a true signal and at the end of signal $P_4$ flip-flop L1 will remain in the false state. Then at the end of signal $P_5$ flip-flop G1 would be switched to the false state by a true signal passing through AND gate 356 which is enabled by true signal $E_8$. The output of AND gate 356 is coupled to OR gate 76. The oscillator 75 is turned off. Before the system may commence, the operator is to manually insert the character into the system. Therefore, since this is the first character, column count signal $K_1$ is true and signal $K_1$ enables an AND gate 341 (FIG. 3) in logic means 59 so that one of the respective grain lights 50 would light up. This would cause the light spot 353 to shine above the first character on the screen 41. Referring briefly to the logic means 59, the means 59 has eight AND gates 341 to 348 and each gate has a respective signal $K_1$, $K_2$, $K_3$, $K_4$, $K_5$, $K_6$, $K_7$ or $K_8$ coupled to one of its inputs. The other input of AND gates 341 to 348 each have the output of an AND gate 349 coupled thereto. Signals $E_8$, $L_1'$, and $P_1$ are coupled to the inputs of AND gate 349, and this arrangement causes only one of the lights 50 to shine the light spot 353 when the operator is required to push the correct key on the keyboard. Whenever any one of the sixteen keys on the keyboard 42 is pressed, a five bit binary code is formed by means well known in the art. The five bit binary code as produced by the keyboard 42 is indicated by characters $C_1$, $C_2$, $C_3$, $C_4$, and $C_5$ Each one of the bits is fed to one input of one of the respective OR gates 112, 114, 116, 118 and 120 to switch flip-flops M1 to M5 to the respective true and false states corresponding to the binary code represented by $C_1$ to $C_5$. At the same time when one of the keys is pressed, a true signal $C_6$ is formed which passes through OR gate 185 to switch flip-flop L1 true. Also true signal $C_6$ is coupled to OR gate 187 and in turn to the advance input of the character counter 210 to advance the character counter by one count.

Since flip-flop L1 is true, AND gate 340 is enabled to switch flip-flop G1 true. The character stored in flip-flops M1 to M5 is transferred to the core array 200 in the same manner as when the system is scanning a row of characters. The next column of array 200 is read, and, if the column contains information, the system continues to read the next column. If the column contains no information, the system stops and the character is manually entered, and the character counter is advanced by signal $C_6$. When all the columns in the core array 200 are read signal $J_8$ should be true. If signal $J_8$ becomes true when the column counter has stopped in count $K_8$, flip-flop G1 is switched true again by signals $L_1$ and $E_8$ to transfer the character to the array 200. At the end of signal $P_1$, flip-flop L1 is switched false and in turn the column counter 105 is reset as soon as signal $K_9$ is true since AND gate 239 is enabled. Since the column counter is reset before signal $P_1$ again becomes true, flip-flop H1 remains in the true state, since AND gate 201 is inhibited by false signal $K_9$. At the same time the column counter 105 has been reset, the error counter is reset because AND gate 336 passes a true signal. Now AND gate 214 is enabled, and outputting is performed in the manner described above when all eight characters are read by the system during the scanning operation. An example of a row which cannot be properly read is illustrated by row 54 in FIG. 2 in which the entire lower half of the character "2" is missing; such a character could not possibly be read correctly since the scan along path $r_b$ would always be 00000 for which no character exists in the system.

In addition to detecting an error when a character is misread during a "read" scan, it is desirable that another type of error also be detected. This error is one that could occur if an extreme case of vertical misregistration is present, which might result in a character in the row being missed by all four apertures during a scan. In such a case, column counter 105 would not properly correspond to the position of each character in the row. In such a case flip-flop Z1 is to be switched false to provide a rescan. Thus, the inverted column count $K_9'$ is fed to AND gate 237 along with the pulse S produced when the four apertures 22a, 22b, 22c, and 22d leave shroud 24 and enter window 23 to begin a scan. If at least one of the apertures 22a, 22b, 22c, and 22d have properly detected each character in the row, column counter 105 will be at count $K_9$. Thus, when more or less than eight characters are detected during a scan $K_9'$ (the inverse of signal $K_9$) will be true when the pulse S indicating a new scan appeared. If, therefore, $N_1'$ is also true, indicating that the reference pulse was properly intercepted by aperture 22b during the scan of the row, so that eight characters should have been counted, then pulse S passes through the output of AND gate 237 and through OR gate 233 to switch flip-flop Z1 false and initiate a rescan, in which case operation proceeds just the same as if the error were a result of misreading a character, as described previously. It will be noted that since $N_1'$ is false during outputting, as a result of N1 having been switched true since $B_R'$ became true (see FIG. 7), flip-flop N1 will necessarily remain true during outputting and $N_1'$ will remain false to prevent any possible interference occurring during outputting.

Now, referring to FIG. 10, a typical embodiment of the code converter 110 of FIG. 8 is illustrated, showing in particular the logical circuitry by means of which the corect code signal Vc and the error code signal Ve are produced. From FIG. 10, it will be seen that signals $P_1$ to $P_{10}$ obtained from flip-flops P1 to P10 in FIG. 8 are fed to each of sixteen AND gates 301 to 316, each such AND gate forming the logical product of a ten-digit binary number representative of a respective one of the sixteen characters in the system. For example, AND gate 301 forms the product of the ten-digit binary number corresponding to character "O," inverters I being used to invert appropriate ones of the signals $F_1$ to $F_{10}$. It will be evident from FIG. 1 and the description of the character identifying unit 250 of FIG. 7, that character "O" is represented by $F_1$ to $F_{10}$ being set to the ten-digit binary number 1000110001, the first five binary digits respectively correspondingly to a scan of zones U, V, W, X, and Y along path $r_t$ (FIG. 1), while the last five digits respectively correspond to a scan of zones U, V, W, X, and Y along path $r_b$. Thus, by inverting $F_2$, $F_3$, $F_4$, $F_7$, $F_8$, and $F_9$ before they are applied to AND gate 301, the output $T_0$ of AND gate 301 will be true only if $F_1$ to $F_{10}$ are set in accordance with the character "O." In a similar manner, inverters (not shown) are appropriately provided in particular ones of the inputs of AND gates 302 to 316 so that each will correspond to a respective one of the other characters in the system. As a result, each of the outputs $$T_1, T_2, T_3, T_4, \ldots T_{\Xi}$$

of AND gates 302, 303, 304 . . . 316 will be true only when $F_1$ to $F_{10}$ are set to the character in the system whose product is formed by the AND gate respectively corresponding thereto, the subscripts of the "T" outputs indicating the particular character in the system whose product is formed by each respective AND gate.

The sixteen signals $$T_0 \text{ to } T_{\Xi}$$

thus derived in FIG. 10 are each fed to an OR gate 350, whose output 350a is in turn fed to an input of an AND gate 324 along with the signal on output 119a of AND gate 119 shown in FIG. 8. Since the signal on output 350a of OR gate 350 is true only when $F_1$ to $F_{10}$ represent a character of the system, and the signal on output 119a is true only when a "read" scan has been performed on the character scanned, the signal on output 324a of AND gate 324 will be true only when a character has been correctly read during a "read" scan. The signal on output 324a may thus conveniently serve as the code correct signal Vc, as shown.

It will further be seen in FIG. 10 that the inverted signal on output 350a' is fed to one input of AND gate 322, while the signal on output 119a is fed to the other input thereof. Thus, it will be understood that the signal on output 322a of AND gate 322 will be true only if $F_1$ to $F_{10}$ does not correspond to a character in the system (in which case the signal in output 350a is false and the signal in output 350a' is true) and if, in addition, the signal on output 119a is true indicating that a "read" scan was performed on the character scanned so that a proper reading should have been obtained. The signal on output 322a, may, therefore, conveniently serve as the code error signal Ve.

The actual conversion of the ten-digit binary representation of $F_1$ to $F_{10}$ is performed in code converter 110 by means of code conversion circuitry 330, which may be of conventional design. In order to permit conversion of $F_1$ to $F_{10}$ only when a character has been properly read during a "read" scan, code conversion circuitry 330 is caused to operate only in response to the signal on output 324a of AND gate 324 becoming true. This is indicated in FIG. 10 by output 324a (which is also the code correct signal Vc) being fed to code conversion circuitry 330 for use as an energization signal therefor.

As mentioned previously, rescanning of a row of characters is performed by stopping the tape 12 and energizing solenoid 56 on the optical back-up means 30 (FIG. 3). Referring now to FIGS. 11, 12, 13 and 14 and in particular to FIG. 11, a detailed description of the optical back-up means 30 will now be given. The optical back-up means 30 includes a base 361 which is mounted and fixed to the system, by suitable means (not shown). The base 361 supports the solenoid 56, which is more clearly shown in FIGS. 12 and 14, and which when energized initiates the rescanning operation. Another solenoid 362 is mounted on the base 361, and when the solenoid 362 is energized the system is able to read tapes with the drum 20 rotating in the opposite direction then in the direction arrow 39 (FIG. 3) points. Reversing the drum rotation is desirable when the reference mark 46 happens to be positioned on the left side of the rows of characters instead of the right side. The mirror 29 is mounted to the base 361 so that the mirror 29 pivots about the horizontal axis 51 and also pivots about a vertical axis which crosses the axis 51. Pivoting of the mirror about these two axes is accomplished by mounting the mirror 29 on a bracket 363 having extensions 363a which are mounted to a yoke 364 by aligned dowels 366 (see FIG. 13), disposed on axis 51, such that the bracket 363 and mirror 29 pivot about the dowels. The extensions 363a on the bracket 363 are so designed that the axis 51 is disposed substantially within the plane of the mirror 29. The yoke 364 has a bore 367 which engages in journal relationship a protruding cylindrical portion 368 formed on the base 361. A spring clip 370 holds the yoke 364 in fixed axial relationship with the base 361. Thus, when solenoid 362 is energized, an armature 369 (FIG. 11) is drawn into the solenoid 362 and pulls on a spring 371 which in turn pulls on a dowel 372 causing the yoke 364 to pivot about the vertical axis counterclockwise (as viewed in FIG. 12) for example, ½ degree against the action of a spring 373 (FIG. 14) until the yoke 364 bears against a set screw 374. On the other hand, when solenoid 362 is de-energized, the spring 373 rotates the yoke 364 clockwise (as viewed in FIG. 12) until the yoke 364 bears against another set screw 376 (as shown in FIG. 12). Thus, when the solenoid 362 is energized the mirror 29 is in a position which allows the system to read tapes 12 that are inserted in the system as shown in FIG. 3 with the image of the reference mark 46 positioned on the left side of the row of characters. Thus the position of the mirror 29 causes the image of the row of characters to be slightly canted with respect to the drum 20 as shown in FIG. 15. However, for clarity, the canted position of the image relative to the drum 20 shown in FIG. 15 is exaggerated because the angle $\alpha$ as used in the system is approximately one quarter of a degree. Now, if the tape 12 is inserted into the system with the reference mark 46 on the opposite side than as shown in FIG. 3 because the tape happened to be rolled up from the opposite end, then in order to read the tape, the direction of rotation of the drum 20 is reversed, and the solenoid 362 is de-energized. When solenoid 362 is de-energized the mirror 29 rotates about the vertical axis, which is disposed parallel to the axis of rotation of the drum. The resultant relative position of the image of the row of characters on the drum 20 is as shown in FIG. 16. The direction of rotation of the drum 20 is in the direction of arrow 39'. Again, for clarity, the canted position of the image is exaggerated. Thus, it is obvious, that in either case, the apertures 22a, 22b, 22c, and 22d scan the images of the characters parallel to the rows. This feature, just described, is desirable as it provides a system with greater versatility by simply closing a switch (not shown).

In addition, the means 30 allows the mirror 29 to pivot, e.g., about one-quarter of a degree, about the axis 51 which is perpendicular to the vertical axis. The mirror 29 pivots about the axis 51 when solenoid 56 is energized whenever signal $Q_1$ is true. When solenoid 56 is energized, an armature 377 (FIG. 12) is pulled into the solenoid. The armature 377 is suitably linked to a lever 378 which is pivotly mounted to the base 361 by a pin 379 (more clearly shown in FIG. 13). Therefore, when the solenoid 56 is energized, lever 378 is rotated counterclockwise (as viewed in FIG. 12) against the action of the spring 57. When the energized solenoid rotates lever 378, a link 381 which is pivotally connected at the other end of the lever 378 moves towards the bottom of FIG. 12. The link 381 engages in journal relationship a dowel 382 which is integrally fixed to the bracket 363 to cause the bracket 363 and the mirror 29 to pivot slightly in a counterclockwise direction about axis 51 (as viewed in FIG. 11). This motion of the mirror 29 causes the images of the row of characters on the drum 20 to move in the opposite direction than arrow 40 points. It should be noted that the link 381 and the dowel 382 are free to move relatively to each other axially, and in addition the dowel 382 is free to rotate within the link 381.

The solenoid 56 is de-energized when one-shot Q1 switches false, then the image of the row of characters on the drum is made to move in the direction of arrow 40 by the spring 57 pulling against the dashpot 58. Since the system is ready to read the row of characters and since the clock frequency is set at which the logical circuitry of the system operates, the image of the row of characters should not move too slow or too fast in the direction of arrow 40 (FIG. 3). The image should move at the same rate as when the image of the row of characters is moved due to the motion of the tape in the direction of arrow 11 (FIG. 3). Thus, the function of the dashpot 58 is to act as a dampener so that the rate at which the mirror 29 returns to its original position is controlled. The dashpot 58 is comprised of a closed end, outer cylinder 383 (FIG. 12) which is suitably bolted to the base 361 and of a piston 384 which fits snugly within the cylinder 383 and slides therein. As it is common in dashpots the head end of the cylinder 383 is vented to the atmosphere by a bore (not shown) of suitable size to allow the piston 384 to be drawn out of the cylinder 383 at a predetemined rate. When the spring 57 causes the lever 378 to rotate clockwise (as viewed in FIG. 12) the mirror 29 rotates clockwise about axis 51 as viewed in FIG. 11, and the image of the row of characters moves in the direction of the arrow 40. The system attempts to read the characters in the manner described above. Set screws 386 and 387 are provided to limit the motion of the lever 378 and in turn, the mirror 29.

With the present disclosure in view, modifications of the invention will appear to those skilled in the art. Accordingly, the invention is not limited to the exact details of the demonstrated preferred embodiment but includes all such modifications and variations coming within the scope of the invention as defined in the appended claims.

What is claimed is:

1. In a character reading system for reading a record medium having a plurality of characters printed thereon: scanning means for scanning said characters so that the characters are read by said system; projection means for projecting an image of said characters onto said scanning means so that said characters can be scanned by said scanning means; means for moving said record medium so that said image of said characters moves across said scanning means; and means for detecting when any one of said characters has been misread by the system and then stopping the motion of the record medium; said projection means including means for altering the projecting means and thereby the projection of the image of said characters onto said scanning means so that any one of the characters misread can be rescanned by said scanning means.

2. In a character reading system for reading tapes having a plurality of characters recorded in rows thereon: scanning means for scanning said characters, so that the characters are read by the system; error detecting means for detecting when at least one of the characters in a row has been misread and producing an error signal; projection means including a screen for projecting the row with the misread characters thereon; illuminating means capable of projecting a spot of light on said screen at any of the characters projected thereon; and means coupled to said detecting means to be responsive to said error signal for automatically activating said illuminating means to selectively shine a light spot over each misread character displayed on said screen.

3. In a character reading system: a record medium having a plurality of characters recorded thereon, a reading station including means for moving said record medium relative to said reading station, optical scanning means for scanning said characters so that said characters are read by said system, projection means including a mirror and a lens for projecting said characters onto said scanning means as the characters pass the reading station, error detecting means for indicating when any one of the characters has been misread by the system and then stopping the relative motion between the record medium and the reading station, and means for pivoting said mirror about an axis in one direction and causing the mirror to return so that the image of the misread character moves backwards and then returns across the scanning means to allow the scanning means to rescan the misread character.

4. In a character reading system: a record medium having a plurality of characters recorded in horizontal rows thereon; a reading station including means for moving said record medium relative to said reading station to cause each row, in turn, to be read by the system; optical scanning means for scanning said rows in a direction parallel thereto and along a plurality of spaced paths; first means for projecting an image of said rows onto said scanning means so that the image moves perpendicular to said spaced paths; second means for detecting when the image of a row is in a position with respect to said spaced paths so that the characters in the row may be read; third means coupled to said scanning means for producing an output signal in response to the sensing by said scanning means of the presence of each character segment along said paths to form a group of output signals for each scanned character; recognition means for identifying a character in response to each group of the output signals and producing an error signal when said group of output signals do not correspond to an identifiable character; fourth means responsive to the output signals produced as a result of scanning along a predetermined one of said paths for stopping the relative movement between said record medium and said reading station whenever said error signal is produced; and fifth means including a pivotable mirror and responsive to said error signal for causing the image of the row being scanned to move backwards across said spaced scan paths and then forward so that said scanning means performs at least one rescan of the row which produced the error signal.

5. In a character reading system a tape having a plurality of characters printed in rows thereon: a reading station including means for moving forward said tape relative to said reading station to cause each row in turn, to be read by the system; a rotating drum having a plurality of scanning apertures and disposed to rotate in either direction about its axis; means for projecting an image of said rows of characters onto the periphery of said rotating drum so that said scanning apertures scan each row along a plurality of spaced paths; optical detecting means disposed to receive the light rays passing through said apertures for each of said paths and disposed to produce an output signal in response to the apertures sensing the presence of each character segment along said paths; said means for projecting an image including a lens, and a mirror for reflecting the light rays approximately ninety degrees from said tape onto said drum; a mirror mount for supporting said mirror and including first means for pivoting said mirror about a first axis disposed substantially parallel to the drum axis, so that said image on said drum is projected in a first canted position with respect to the drum when the drum is rotating in one direction and the image is projected in a second canted position with respect to the drum when the drum is rotating in the opposite direction, and said mirror mount including second means for pivoting said mirror about a second axis disposed substantially normal to said first axis so that said image moves axially along said drum as said mirror pivots about said second axis to perform a rescan of a row of characters.

6. In a character reading system: a record medium having a plurality of characters recorded thereon; optical scanning means for scanning said characters and producing electrical signals corresponding thereto; recognition means for identifying a character in response to the electrical signals produced as a result of the scanning of said character by said scanning means, said recognition means also including means for detecting when said electrical signals do not correspond to an identifiable character and for producing an error signal in response thereto; and means responsive to said error signal for causing said scanning means to automatically perform at least one rescan of the character which caused said error signal to be produced; said optical scanning means including a cyllindrical drum having a plurality of apertures formed therein and being disposed to rotate about its axis; a lens for projecting an image of said characters on said drum so that said apertures traverse said image as said drum rotates about its axis; a plane mirror for reflecting the light rays from said record medium to said rotating drum; and said means for causing said scanning means to automatically perform at least one rescan including said mirror, a solenoid, and linkage means linking said solenoid to said mirror for causing said mirror to pivot about an axis disposed normal to the drum axis whenever said solenoid is energized and de-energized in response to said error signal.

7. In a character reading system: a record medium having a plurality of stylized characters recorded in horizontal rows thereon, each of said characters being stylized to have character segments located in predetermined ones of a plurality of horizontally adjacent zones into which each character is divided, the stylizing of each of said plurality of characters being such that a character segment is provided in a position corresponding to the first zone of each character intercepted during scanning thereof; scanning means for scanning said rows in a direction parallel thereto, said scanning means including means for scanning along a plurality of spaced paths during each scan; detecting means for producing an electrical signal corresponding to the presence of each character segment detected along the scan paths upon scanning thereof; counting circuitry responsive to the electrical signal produced when the character segment in the first zone of each character is detected for producing zone signals representing each of the respective zones of the character being scanned; first storage means including at least one storage element for each zone and responsive to said zone signals for storing a group of the electrical signals representing character segments in predetermined ones of said elements; recognition means for identifying a character in response to the electrical signals stored in said first storage means when the zone signal representing the last scanned zone of the character is terminated; second storage means for storing character information representing all the characters in one row; and logic circuitry responsive to the zone signals produced while the next character is being scanned to transfer the character information represented by said electrical signals from said recognition means to said second storage means when said electrical signals are identified as a character.

8. In a character reading system: a record medium having a plurality of characters recorded in rows thereon; a read station including means for moving said record medium relative to the read station; each of said characters having character segments located in predetermined ones of a plurality of horizontally adjacent zones into which each character is divided, the stylizing of each of said characters being such that a character segment is provided in a position corresponding to the first zone of the character intercepted during scanning thereof; scanning means for progressively scanning said rows in a direction parallel thereto, said scanning means including means for scanning along a plurality of spaced paths during each scan; detecting means for producing an electrical signal corresponding to the presence of each character segment along the scan paths during scanning of the characters to form a group of electrical signals for each scanned character; means for producing re-occurring clock signals in response to the electrical signal corresponding to the detection of the character segment in the first zone scanned and for stopping said clock signals after the last zone for the respective character is scanned; counting circuitry for counting the clock signals and for producing zone signals to represent each of the respective zones of the character being scanned, first storage means responsive to said zone signals for storing a group of the electrical signals; recognition means for identifying a character in response to each group of electrical signals stored in said first storage means when the zone signal representing the last zone of the character is terminated, said recognition means including a second storage means for storing in said second storage means information representing the character in said first storage means when the group of electrical signals in said first storage means is identified as a character, and also including means for determining when the group of electrical signals in said first storage means does not correspond to an identifiable character to produce an error signal in response thereto; third storage means for storing the character information for all the characters in one row; and logic circuitry responsive to the zone signals produced while the next character is being scanned to transfer the character information from said second storage means to said third storage means.

9. In a character reading system: a record medium having a plurality of characters recorded thereon; optical scanning means for scanning said characters and producing electrical signals corresponding thereto; recognition means for identifying a character in response to the electrical signals produced as a result of scanning one of said characters by said scanning means, said recognition means also including means for detecting when said electrical signals do not correspond to an identifiable character and for producing an error signal in response thereto; projection means including a mirror and a lens for projecting an image of said characters on said scanning means; a mount for mounting said mirror to pivot about a first axis disposed substantially within the plane of said mirror; a solenoid disposed on said mount; linkage means linking the armature of said solenoid to said mirror to cause the mirror to pivot in one direction and return about said first axis so that the image moves in one direction and returns across the scanning means whenever said solenoid is energized and de-energized; and logic circuitry means responsive to said error signal for energizing and de-energizing said solenoid to cause a rescan of the character producing the error signal.

10. In a character reading system: a record medium having a plurality of characters recorded thereon; optical scanning means for scanning said characters and producing electrical signals corresponding thereto, said optical scanning means including a cylindrical drum having a plurality of apertures formed therein and disposed to rotate about its axis, so that the characters are scanned by said apertures across a plurality of scan paths; first means for providing relative movement between the characters on said record medium and said scanning means in a direction substantially normal to the scan paths; recognition means for identifying a character in response to the electrical signals produced as a result of the scanning of the respective character by said scanning means, said recognition means also including first logical circuitry means for detecting when said electrical signals do not correspond to an identifiable character and for producing an error signal in response thereto; lens means for projecting an image of said characters on said drum so that said apertures traverse said image as said drum rotates about its axis; a plane mirror for reflecting the light rays from said record medium onto said rotating drum; a mount for mounting said mirror to pivot about a first axis disposed substantially within the plane of said mirror and normal to the drum axis; second means included in said mount for pivoting said mirror about a second axis disposed substantially parallel to the drum axis and intersecting said first axis; a first solenoid disposed on said mount; first linkage means linking the armature of said first solenoid to said mirror to cause the mirror to pivot in one direction and return about its first axis; a second solenoid disposed on said mount; second linkage means linking the armature of said second solenoid to said mirror to cause the mirror to pivot in one direction and return about its second axis; and second logical circuitry means responsive to said error signal for energizing and de-energizing said first solenoid to cause a rescan of the character producing the error signal.

11. In a character reading system: a record medium having a plurality of stylized characters recorded in horizontal rows thereon; a reading station including first means for moving said record medium relative to said reading station to cause each row, in turn, to be read by the system; optical scanning means for scanning said rows in a direction parallel thereto and along a plurality of spaced paths; first means for projecting an image of each row of characters onto said scanning means; second means including a screen for projecting an image of the row of characters being scanned onto said screen; optical detecting means coupled to said scanning means for producing an output signal in response to the sensing by said scanning means of the presence of each character segment along said paths, to form a group of output signals for each scanned character; matrix storage means having a plurality of column storage positions; recognition means for identifying a character in response to each group of said output signals produced as a result of the scanning of one of said characters by said scanning means, and placing information representing the character in a respective column position of said storage means, said recognition means also including means for producing an error signal when a character is not identified; means responsive to said error signal for causing said scanning means to automatically perform a rescan of the row which caused said error signal; an error counter for counting the number of times a rescan has been performed on the same row and producing a final error signal after a predetermined number of error signals have been counted for the respective row; logic circuitry means responsive to said final error signal for reading each column position of said storage means to detect if the column position contains character information and for rewriting the same information read-out of the respective column position when the column position stored information; and said logic circuitry means including means for visually indicating which character in the row displayed on said screen should be placed in a column position of said storage means when reading of the respective column position revealed that no information is stored therein.

12. In a character reading system: a record medium having a plurality of characters recorded in rows thereon; a reading station including means for moving said record medium relative to said reading station; optical scanning means for scanning said rows in a direction parallel thereto so that said characters are read by said system; means including a screen for projecting an image of the row of characters being scanned onto said screen; matrix storage means having a plurality of column storage positions for storing in respective column positions information representing each respective character in a row of characters; recognition means for identifying a character in response to a group of the output signals and then storing the character information in said storage means when a character is identified, and producing an error signal when a character is not identified; logic circuitry means responsive to said error signal for halting further scanning of a row and then reading, in turn, each column position of said storage means, to detect if the column position contained character information, and to rewrite the information read out of the respective column position when the reading of the column position indicates that character information has been stored therein; and said logic circuitry means including means for halting the reading of said storage means when the reading of the column position indicates that no character information has been stored therein, and for visually indicating which character displayed on said screen produced the error signal.

13. In a character reading system: a record medium having a plurality of characters recorded thereon; a reading station including means for moving forward said record medium relative thereto; optical scanning means for scanning said character and producing electrical signals corresponding thereto; recognition means for identifying a character in response to the electrical signals produced as a result of the scanning of one of said characters by said scanning means, said recognition means also including means for detecting when said electrical signals do not correspond to an identifiable character and for producing an error signal in response thereto; said optical scanning means including a cylindrical drum having a plurality of apertures formed therein and disposed to rotate about its axis, a lens for projecting an image of said characters on said drum so that said apertures traverse said image along a plurality of spaced paths as said drum rotates about its axis, a plane mirror for reflecting the light rays from said record medium onto said rotating drum, a mount for mounting said mirror to pivot about a first axis disposed substantially within the plane of said mirror, and normal to the drum axis, a solenoid having an armature disposed on said mount, linkage means linking the armature of said solenoid to said mirror to cause the mirror to pivot about said first axis from its original position whenever said solenoid is energized, a spring connected to said linkage means to cause the mirror to pivot about said first axis and return to its original position whenever said solenoid is de-energized, dashpot means for controlling rate of pivoting that said mirror returns to its original position to simulate the forward motion of said record medium with respect to said reading station, and logic circuitry means responsive to said error signal for energizing and de-energizing said solenoid to cause a rescan of the character producing the error signal.

14. In a character reading system: a record medium having a plurality of characters recorded thereon; a reading station including means for moving forward said record medium relative thereto; optical scanning means for scanning said characters and producing electrical signals corresponding thereto; recognition means for identifying a character in response to the electrical signals produced as a result of the scanning one of said characters by said scanning means, said recognition means also including means for detecting when said electrical signals do not correspond to an identifiable character and for producing an error signal in response thereto; said optical scanning means including a cylindrical drum having a plurality of apertures formed therein and disposed to rotate about its axis; a lens for projecting an image of said characters on said drum so that said apertures traverse said image as said drum rotates about its axis, a plane mirror for reflecting the light rays from said record medium onto said rotating drum; a mount for said mirror to pivot about a first axis disposed substantially within the plane of said mirror, and normal to the drum axis; a solenoid having an armature disposed on said mount; linkage means linking the armature of said solenoid to said mirror to cause the mirror to pivot about said first axis from its original position whenever said solenoid is energized; a spring connected to said linkage means to cause the mrror to pivot about said first axis and return to its original position whenever said solenoid is de-energized; dashpot means for controlling the rate of pivoting that said mirror returns to it soriginal position, said dashpot means including a closed ended cylindrical contaner fixed to said mount, and a piston slideably engaging said cylindrical container and connected to said linkage means so that the piston slides in and out of said cylindrical container whenever said mirror pivots and returns about said first axis, and said closed ended cylindrical container having a small orifice to control the rate at which the fluid passes therethrough into the container as said piston is pulled out of said cylindrical container by said spring so that said piston moves at a constant rate.

References Cited

UNITED STATES PATENTS

| | | | |
|---|---|---|---|
| 3,217,294 | 11/1965 | Gerlach | 340—146.3 |
| 3,264,610 | 8/1966 | Rabinow | 340—146.3 |
| 3,270,319 | 10/1966 | Schmid | 340—146.3 |
| 3,346,853 | 10/1967 | Koster | 340—324.1 X |

MAYNARD R. WILBUR, *Primary Examiner.*

JAMES A. SHERIDAN, *Assistant Examiner.*